US007089322B1

(12) United States Patent
Stallmann

(10) Patent No.: US 7,089,322 B1
(45) Date of Patent: Aug. 8, 2006

(54) SYSTEM AND METHOD OF AGGREGATING DATA FROM A PLURALITY OF DATA GENERATING MACHINES

(75) Inventor: Mark Stallmann, Lombard, IL (US)

(73) Assignee: Motient Communications Inc., Lincolnshire, IL (US)

( * ) Notice: Subject to any disclaimer, the term of this patent is extended or adjusted under 35 U.S.C. 154(b) by 697 days.

(21) Appl. No.: 09/697,316

(22) Filed: Oct. 27, 2000

Related U.S. Application Data

(60) Provisional application No. 60/161,907, filed on Oct. 28, 1999.

(51) Int. Cl.
*G06F 15/173* (2006.01)
(52) U.S. Cl. .......................... 709/238; 705/10; 705/14; 705/16; 705/17; 705/21; 709/238; 709/240
(58) Field of Classification Search .................. 705/10, 705/14, 16–17, 21; 709/238–240
See application file for complete search history.

(56) References Cited

U.S. PATENT DOCUMENTS

| | | | |
|---|---|---|---|
| 4,412,292 A | 10/1983 | Sedam et al. | |
| 4,611,205 A | 9/1986 | Eglise | 340/825.35 |
| 4,907,250 A | 3/1990 | Ricks | 377/7 |
| 4,972,504 A * | 11/1990 | Daniel et al. | 705/10 |
| 5,091,713 A | 2/1992 | Horne et al. | 340/541 |
| 5,317,566 A * | 5/1994 | Joshi | 370/238 |
| 5,415,264 A | 5/1995 | Menoud | 194/217 |
| 5,442,568 A | 8/1995 | Ostendorf et al. | |
| 5,475,597 A | 12/1995 | Buck | |
| 5,532,939 A * | 7/1996 | Psinakis et al. | 709/226 |
| 5,608,643 A | 3/1997 | Wichter et al. | |
| 5,719,771 A | 2/1998 | Buck et al. | |
| 5,822,216 A | 10/1998 | Satchell, Jr. et al. | |
| 5,844,808 A * | 12/1998 | Konsmo et al. | 700/244 |
| 5,918,213 A * | 6/1999 | Bernard et al. | 705/26 |
| 5,924,077 A * | 7/1999 | Beach et al. | 705/10 |
| 5,930,771 A | 7/1999 | Stapp | 705/28 |

(Continued)

FOREIGN PATENT DOCUMENTS

WO    WO9708638    *    3/1997

(Continued)

OTHER PUBLICATIONS

Brown "Software links POS with multiple nets"; Oct. 1988; Network World; pp. 1-2.*

(Continued)

*Primary Examiner*—Romain Jeanty
(74) *Attorney, Agent, or Firm*—Irah H. Donner; Wilmer Cutler Pickering Hale and Dorr LLP

(57) ABSTRACT

A system and method for collecting and aggregating data from a plurality of data generating machines. The system includes a plurality of data generating machines each having a transceiver for transmitting data pertaining to a monitored sales event of each of the plurality of data generating machines via at least one of a terrestrial, Internet, satellite, and landline network. At least one first computer receives and cumulatively stores the data transmitted by each of the plurality of data generating machines. At least one second computer is operatively communicable with the at least one first computer and runs at least one application software program that analyzes the data to determine consumer buying habits and/or preferences. Advertising data can be transmitted that provides message content at least partially determined by an analysis of the data.

39 Claims, 17 Drawing Sheets

U.S. PATENT DOCUMENTS

| | | | |
|---|---|---|---|
| 5,941,363 A | | 8/1999 | Partyka et al. |
| 5,953,319 A | | 9/1999 | Dutta et al. ................. 370/238 |
| 5,963,452 A | | 10/1999 | Etoh et al. |
| 5,974,396 A | * | 10/1999 | Anderson et al. ............. 705/10 |
| 5,992,888 A | * | 11/1999 | North et al. .................. 283/56 |
| 6,021,394 A | * | 2/2000 | Takahashi .................... 705/10 |
| 6,038,491 A | | 3/2000 | McGarry et al. ........... 700/231 |
| 6,056,194 A | | 5/2000 | Kolls |
| 6,078,891 A | | 6/2000 | Riordan et al. |
| 6,456,981 B1 | * | 9/2002 | Dejaeger et al. .............. 705/14 |
| 6,462,644 B1 | * | 10/2002 | Howell et al. ............. 340/5.92 |
| 6,578,728 B1 | * | 6/2003 | Weigen .......................... 221/2 |
| 6,628,764 B1 | * | 9/2003 | Petite .................... 379/106.01 |

FOREIGN PATENT DOCUMENTS

| | | | |
|---|---|---|---|
| WO | WO9728510 | * | 7/1997 |
| WO | WO 9607134 | * | 8/1997 |
| WO | 0029529 | * | 10/1999 |

OTHER PUBLICATIONS

"Software Product Description". *digital*, Dec. 1993.

Motorola. 1995. *DataTac Open Protocol Specifications: User's Guide*. Richmond, Virginia: Motorola, Inc.

Motorola. 1995. *DataTac Open Protocol Specifications: Standard Context Routing Release 1.0*. Richmond, Virginia: Motorola, Inc.

Motorola 1995. *DataTac Open Protocol Specifications: DataTac Messaging Release 1.0*.

Motorola 1995. *Wireless Data Communications: The Choices*.

Stilwell, Markus. *What is Data Mining?* Nov. 16, 1995. www.cs.usask.ca/homepages/grads/mgs310/Cmpt826S3/node5.html.

Motorola. 1997. *DataTac Wireless Data Networks: Applications Development Guide* Richmond, Virginia: Motorola, Inc.

Motorola 1996. *DataTac Networks: Introduction for Application Developers*.

ARDIS Company. 1997. *ARDIS DataTac 4000: Software Developers Reference Guide*. Revision 2.0.

Motorola 1997. "Multiple Agencies Share New System in Peel Region". *Exchange Online*. www.Motorola.com/LMPS/RNSG/exchange/spr97/index.html.

Fabris, Peter. "Advanced Navigation". *CIO Magazine*, May 15, 1998.

"Unicenter TNG: Total Enterprise Management". *Computer Associates*, 1999.

*In The News*, 1999 Press Releases. Jul. 19, 1999. www.motient.com/Content/IntheNews/PressReleases/1999PressRelease/99-20.html.

Greiner, Lynn. "Online Management Becomes the Real Thing". *Computer Dealer News*, Aug. 27, 1999. www.cstartech.com/real_thing.html.

Salkintzis, Apostolis K. "A Survey of Mobile Data Networks". *IEEE Communications Surveys*, Third Quarter 1999, vol. 2, No. 3.

Fonseca, Brian. "Computer Associates touts its Unicenter platform for device management". Infoworld.com, Apr. 11, 2000. www.infoworld.com/cgi-bin/deletefr...cles/en/xml/00/000411encamobile.xn.

"Computer Associates and Motient Extend Wirless Enterprise Applications for eBusiness". *AboutMotient*, Apr. 11, 2000. www.motient.com/content/aboutmotiens/businesspartners/ca.html.

Casselman, Grace. *NetworkWorld*, May 5, 2000. www.itworldcanada.com/nw/archive/nw10-09/nw_Wtemplate.cfm?filename=n109n2.html.

Menezes, Joaquim. "Enterprise Computing". *Computing Canada, The Newspaper for Information Technology Management*, vol. 26, Issue 11, May 26, 2000. www.cstartech.com/enterpise2.html.

"Vending" *Rutherford & Associates*, Sep. 2000. www.ruthsx.com/products/vending.html.

Creating Internet Wave III by Connecting Non-IT World to IT World Via any Media [Wireless WAN, LAN, Landline & PLC (power Line Carrier)]. *CStar Technologies Inc.*. www.startech.com/newpg.htm.

"Enterprise Management Strategy". *Unicenter TNG*, Sep. 2000. http://cai.com/products/unicent/whitepap.html.

Sevitt, Carol. Solbyung (Stella) Yoon: Living Her Dream. *Rotman Management*, Spring/Summer 2000. www.cstartech.com/rotmanm.html.

"System Performance & Hardware Platform". Sep. 2000. http://www.cstartech.com/hard.html.

"Mobile eBusiness Applications Take Off with ARDIS Wireless Data Network Seamlessly Integrated With CA's Unicenter TNG". *Press Room*, Apr. 11, 2000. wysiwyg://235/http://www.ca.com/press/2000/04/tng_americanmobile.html.

"DirectGate™, Features & Benefits". Sep. 2000. http://www.Cstartech.com/ben.html.

"CA and cStar Partner to Deliver Increased Customer Service Levels and Reduced Operational Costs With Remote eBusiness Management Solution". *Press Room*, Apr. 11, 2000. wysiwg://231/http://www.ca.com/press/2000/04/tng_vending.html.

"SNA" *ATM Protocol Directory*, Sep. 2000. http://www.protocols.com/pbook/sna.html.

"X.25". *ATM Protocol Directory*, Sep. 2000. http://www.protocols.com/pbook/x25.html.

"Unicenter TNG® Optimal Vending Solution". *Real World Management Solutions*.

McMahan, Michael L., Ali Khatzibadeh and Pradeep Shah. "Wireless Systems and Technology Overview" *Texas Instruments*.

International Preliminary Examination Report.

* cited by examiner

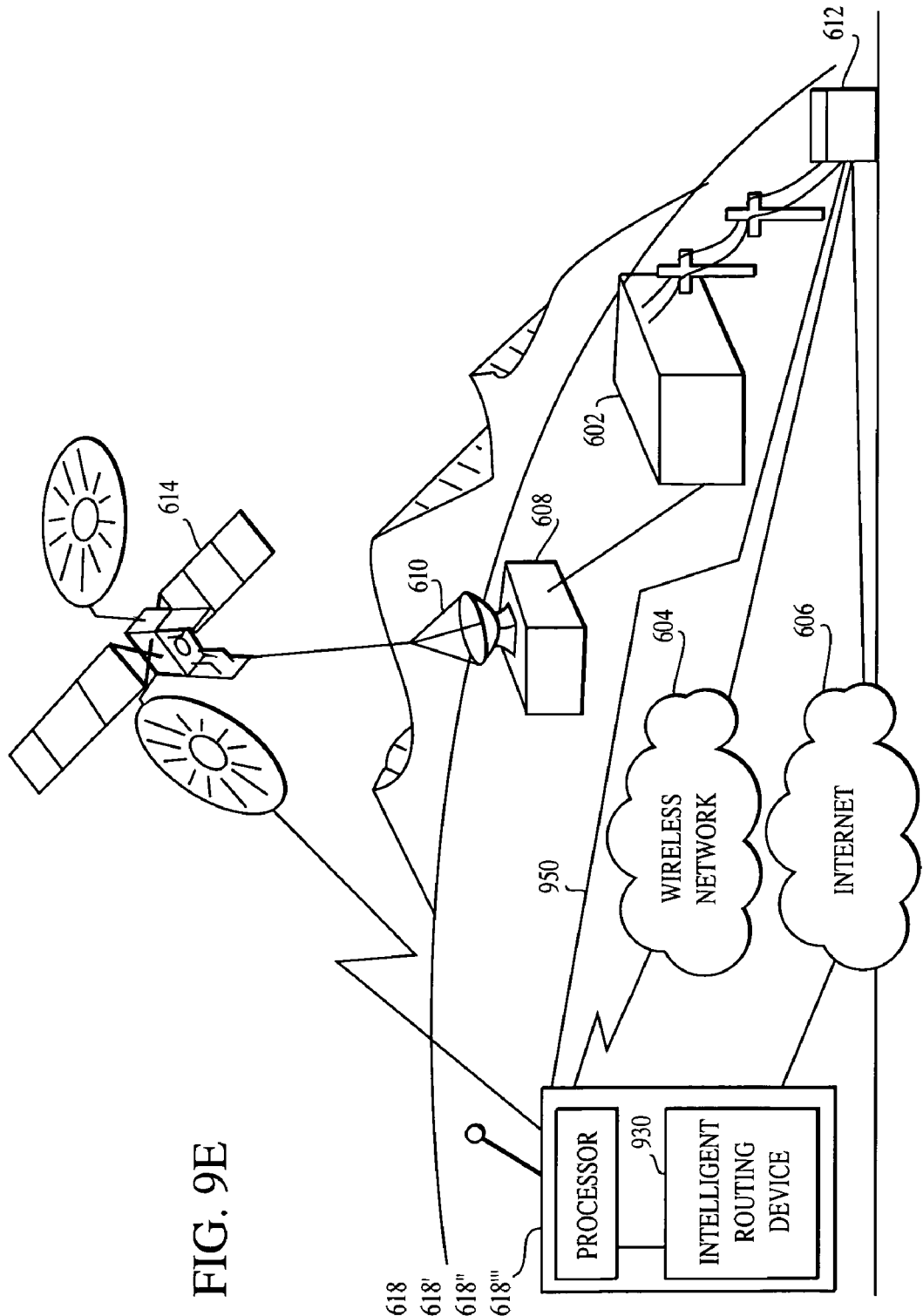

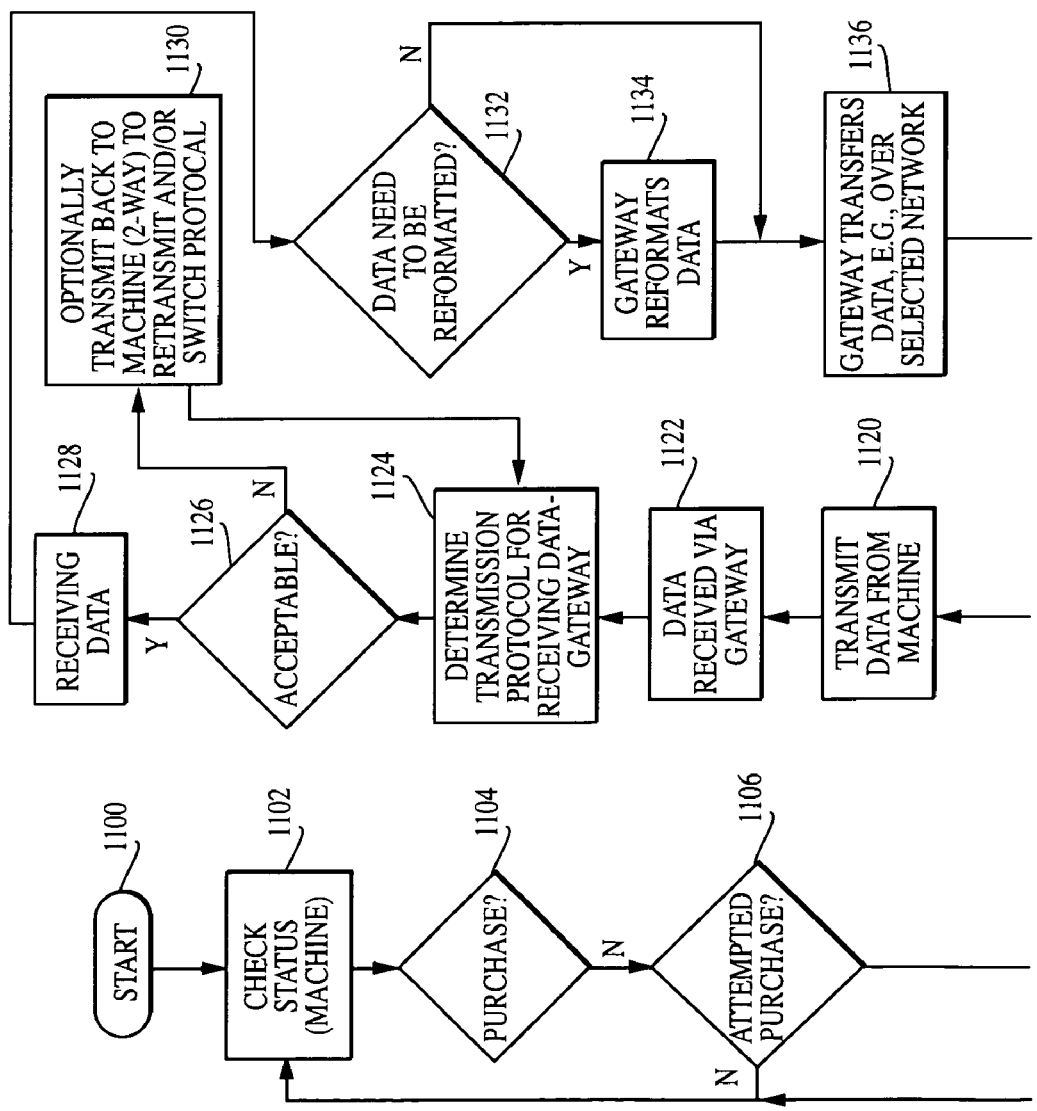

SYSTEM AND METHOD OF AGGREGATING DATA FROM A PLURALITY OF DATA GENERATING MACHINES

RELATED APPLICATIONS

This application claims priority from U.S. provisional application Ser. No. 60/161,907 filed on Oct. 28, 1999 and entitled "Telemetry 2000 Objectives", the details of which are hereby incorporated by reference.

BACKGROUND OF THE INVENTION

1. Field of the Invention

The present invention relates generally to a system and method of collecting data from a plurality of data generating or collecting machines such as vending machines and, more particularly, to a system and method of aggregating the collected the data and performing statistical analyses on the data to provide for increased sales, improved brand tracking and/or improved demand analysis.

2. Background Description

Vending machines are well known and have existed since the late nineteenth century. Some of the first vending machines were rudimentary devices primarily designed to dispense goods such as cigarettes and postcards.

Modern vending machines are employed to store and dispense a vast array of merchandise. They generally accept both coin and paper bills, and have the advantage of being able to be placed in most any location without requiring the constant presence of an employee to sell products. In response to a customer request and appropriate payment, vending machines now dispense merchandise such as drinks, candy, frozen deserts, snacks, video tapes, cosmetics, office supplies and children's toys.

The U.S. vending market alone comprises approximately 4.2 million vending machines and is a $28 billion industry. Vending managers are increasingly challenged to leverage the power of new technology to better manage their assets and enhance the efficiency of operations. Ideally, vending machines can be transformed from a simple point of sale device at the very end of the transaction to interactive participants in the value chain.

A substantial percent of vending machines are located in places such as factories, office buildings, public parks and other locations that repeat customers regularly frequent. Vending machine operators have found that by locating a vending machine in a high traffic area that is regularly visited by the same customers, they can take advantage, for example, of repeat sales and brand loyalty.

The need to gather sales (and machine diagnostic) information for individual vending machines and/or a relatively small group of vending machines in a particular location or on a particular supply route has long been recognized by the vending industry. Consequently, virtually all electronic vending machines maintain audit information on their controller cards, which can be retrieved through an industry standard interface. A number of data harvesting solutions exist, but I have determined that none are directed to aggregating sales data from a plurality of different vending machines potentially having different data interfaces over a disparate geographic area for use in statistical analysis to provide for increased sales, improved brand tracking and/or improved demand analysis.

Installing a remote data gathering solution offers other important business benefits in the eBusiness supply chain and in reconciling the receipts from the machine. Trucks going out to restock vending machines, for example, can now be loaded with the right quantities of potentially different products for different machines, taking the guesswork out of the process and increasing driver productivity and profitability. Also, should any unusual activity occur (e.g., the machine sells out on a very hot day and/or the refrigeration unit breaks down and/or is malfunctioning) the owner can be informed immediately, so the machine can be restored to service. Due to the location and nature of operation of vending machines, the vending machine industry has seldom favored the installation of additional wiring for data transmission so, in almost all situations, a wireless solution has become preferable.

Several prior art patents exist that relate to collecting vending machine sales data and/or monitoring machine conditions for individual machines. U.S. Pat. No. 5,930,771 to Stapp, incorporated herein by reference, for example, relates to an apparatus and method for monitoring inventory in vending machines. As merchandise is dispensed, transaction records including, for example, the date and time of sale, the code of the product dispensed, and the exact count of bills/coin denominations tended by the buyer are generated and stored within each vending machine. At a predetermined time, stored information about each vending transaction is transmitted via a cellular telephone interface and modem to a central computer. Transaction records from each machine may be statistically analyzed. Inventory status and change remaining in a vending machine may also be communicated to the central computer.

As shown in FIG. 1, U.S. Pat. No. 5,930,771 shows a schematic block diagram of a typical vending machine. A product selection panel 112 contains a plurality of product selection buttons 114. Buttons 114 are used by a buyer to select from a variety of products 118 displayed in dispensing unit 116. Products 118 are disposed in uniquely identified racks 122. A machine-readable identification code such as a bar code (not shown) is affixed to each rack 122. Each rack 122 comprises a number of positions (not shown), each position being capable of retaining a single unit of product 118 to be dispensed. Each position within each rack 122 may also be uniquely identified with a machine-readable code such as a bar code. A label 120, proximate each product 118, displays both a selection code (e.g., button identification) and selling price. Optional labels 120' are shown connected to display controller 144 which receives input from controller 126.

Decoder 124 receives button-press information from selection unit 112 and produces a signal representative of the rack 122 containing the desired product 118. A coin/currency and/or debit card acceptance unit 128 is provided to receive the requisite number of bills and/or coins from the buyer to purchase the desired product 118. Acceptance unit 128 tallies the money tendered including an exact count of each coin and bill denomination or debit card amount. Acceptance unit 128 generally incorporates a change-providing mechanism supplied with change from change supply 132. Currency collected by acceptance unit 128 is securely stored in currency collection box 130 and held until removed by a machine refill/service employee.

A controller 126 is provided to manage the inventory control functions. Non-volatile memory 134 connected to controller 126 is provided for storing data such as product price, available change, status of inventory amount and/or detailed transaction records. Memory 134 may be implemented in any of many ways well known in the art, typically in dynamic access random memory (DRAM) chips or modules. Controller 126 may be programmed with the instructions necessary for performing the desired functions, or can receive necessary instructions from a programmable read only memory (PROM), programmable array logic (PAL) or other similar programmable memory device.

Real-time clock 136 provides date and time information to controller 126. Modem 138 receives commands and output data from controller 126. These commands are used to initialize modem 138 so that the output data may be transmitted to a remote, central computer 260 (FIG. 2). Modem 138 is connected to a cellular communication interface 140 which, in the preferred embodiment, utilizes a single cellular number. Each vending machine in the system may thus be pre-programmed with an assigned time slot during which it may use the cellular communication link without interference from other machines. Any number of cellular numbers could, however, be employed if the call volume from the vending machines were higher than could be supported using a single number. An input/output port 42 is provided to controller 126 for use by machine refill/service personnel in updating inventory and/or available change status in memory 134 of vending machine 100.

Referring now to FIG. 2, there is shown a prior art block diagram of the overall system of U.S. Pat. No. 5,930,771. A plurality of vending machines 100 are disposed within the communication confines of a cellular communications network. Central computer 260 is equipped with a modem 262 connected to a normal telephone line 264. Statistical analysis and communication software (not shown and both known in the art) running within computer 260 receives data from remotely-located vending machines 100 by means of the cellular communication network consisting of cellular communication interface 140 within each of the plurality of vending machines 100, air-borne telephone signals 270, and cellular receiving station 272 connected to the telephone landline network. A printer 266 may optionally be attached to computer 260 for providing hard copies of the statistical analysis performed by computer 260.

The transaction records from each machine may be statistically analyzed by computer 260 and summaries distributed to management and/or route service personnel. Prior to a visit to a vending machine 100, the route service person may thus have been provided a complete analysis of the machine's performance. He could, therefore, have with him adequate supplies of items which were good sellers and, if required, stock multiple racks 122 with an identical product 118 for each machine. The service person would update the data indicative of the inventory of the machine using a hand-held bar code scanner that gets transmits the information to the central computer 260 via modem 138.

Note that U.S. Pat. No. 5,930,771 is concerned with performing statistical analyses on one or more machines on an individual basis, and is not related to or concerned with aggregating data from a plurality of data generating machines, such as vending machines, that accumulate, obtain and/or store data, and/or performing statistical analyses on such aggregated data, particularly where those machines have different data transmission protocols and/or different data interfaces. That is, the '771 patent uses predetermined times to collect data from individual vending machines and does not appear to collect data and/or aggregate data from each of a plurality of vending machines.

FIGS. 3 and 4 show a prior art vending machine and block diagram of a vending machine system, respectively, from U.S. Pat. No. 5,091,713, incorporated herein by reference. Referring now to FIG. 3, products are delivered from vending machine 340 via dispenser chute 326. An electrical power cord 315 supplies electrical energy to the various electrical systems in vending machine 310 from a conventional wall outlet. Telephone cord 313 provides the necessary communication link between vending machine 310 and the various control/communication systems.

A selector 330, a credit card reader 340, a display screen 350, a bill changer 360 and a printer 370 are provided. Selector 330 includes a coin slot 332 and a change slot 334 with a plurality of adjacent selection buttons 336, and a coin box sensor 338. Screen 350 provides written instructions to the customer. Printer 370 can print a receipt for purchases with the credit card and can also can be used to print coupons, promotional information, and the like. Any change to be returned is discharged into coin return slot 362. Bill changer 360 is directly linked to an alarm system 486 (FIG. 4).

Speaker 380 includes an integral microphone 382 and can be activated by depressing a call button 384 adjacent credit card reader 340, or independently activated by security and/or maintenance personnel. Speaker 380 provides for the delivery of background music, messages, advertisements, and/or audible instructions for the use of the various components of vending machine 310.

Referring now also to FIG. 4, the schematic for the security and inventory apparatus is shown generally at 400 and includes a security station 402, a maintenance control station 404, a comptroller station 406, and an inventory control station 408 interconnected by central computer 410 to vending machine modem 311. Central computer 410 is specifically configured to be coupled with a plurality of vending machines 310, although only one is shown for ease of illustration. Telephone line 313 provides the communication link between vending machine modem 311 and central computer 410, and also provides the direct link of speaker 380 and microphone 382 with security station 402 and maintenance control station 404.

During normal operation, vending machine modem 411 acts as the relay device for transmitting transactional information between the various systems in vending machine 310 and the central computer 410. For example, referring also to FIGS. 3 and 4, a customer will place the appropriate paper money into dollar bill changer 360 or a credit card into credit card reader 340 prior to making a selection with selector 330. Change, if any, is delivered through a change slot 334 and the item of merchandise is delivered to dispenser chute 326. The monies received are likewise recorded electronically by dollar bill changer 360 and coin box 338 and transmitted via vending machine modem 411 and central computer 310 to comptroller 406.

A customer using credit card reader 430 inserts an appropriate credit card along with the personal encoding information. Central computer 410 verifies the authenticity of the credit card and the authorization code thereby activating vending machine 310 to deliver the merchandise selected at selector 330. Simultaneously, a receipt is printed by printer 470 while controller 406 records the transaction and inventory control 408 records the merchandise sold and deducts the same from the inventory record of vending machine 310.

At all times a visual message can be displayed on screen 350 not only to impart operating instructions to the consumer but also to carry merchandise advertising as well as paid advertising for products or services remote from the merchandise sold through vending machine 310. Speaker 380 can also be used in conjunction with screen 350 to transmit the foregoing or supportive information verbally. Security for vending machine 310 is supplied by several features among which are impact sensor 492, alarm 386, and machine condition sensors 490.

Inventory sensor 494 is configured to be interrogated periodically by central computer 410 via vending machine modem 311 to update inventory control 408 with the current status of the merchandise inventory in vending machine 310. This information can be obtained over telephone line 313 during periods of low telephone rate charges. The service person is provided with a precise route and the types and varieties of merchandise for servicing vending machines 310 at each specific location. Additionally, the routing instructions will carry any repair and maintenance instructions for vending machine 310.

Inventory control 408 supplies a continuous flow of sales information about merchandise dispensed through vending machine 310. This allows the operator to maximize sales of merchandise through each vending machine 310 by concentrating high-demand merchandise into vending machines 310 where the most units of that specific merchandise is being sold. Correspondingly, slow moving merchandise can also be identified and even eliminated entirely from the system.

The introduction of a new product can be test marketed relatively inexpensively through vending machine 310. In particular, the new product can be advertised over speaker 380 and screen 350 while sales of the same can be accurately monitored and a running inventory of sales by time of day. Additionally, printer 470 can be used to print rebate slips, coupons, and the like as a further means of identifying consumers and their response to the particular merchandise being dispensed by vending machine 410.

Note that U.S. Pat. No. 5,091,713 is not related to or concerned with, for example, aggregating data from a plurality of machines that accumulate, obtain and/or store data, such as vending machines, or performing a statistical analysis on such aggregated data, particularly where the machines have different data transmission protocols and/or different data interfaces. Instead, the '713 patent primarily relates to an inventory sensing system for providing a continuous update of the inventory in a single vending machine, and does not, for example, relate to aggregating such data from a plurality of vending machines.

FIG. 5 is an illustration from U.S. Pat. No. 6,038,491, incorporated herein by reference, showing multiple vending machines 520, 540 and 560, each of which includes a telemetry device. The vending machines 520, 540 and 560 can include a processor configured to accumulate data corresponding to monitored events occurring in the vending machine. A digital signal processor-based modem in each vending machine 520, 540 and 560 is configured to transmit the accumulated data to the central station 580 via a cellular network 510, 512. The processor can be configured to accumulate data corresponding to monies deposited in and returned from the vending machine 520, 540, 560, inventory remaining in the vending machine, alarm conditions in the vending machine, as well as other vending machine data.

The vending machines 520, 540 and 560 can communicate with a remote central computer station or information management system 580 in a dedicated manner via one of several cellular networks 510, 512 connected by a Mobile Telephone Switching Office ("MTSO") 514 in accordance with a predetermined modem configuration. Each cellular network 510, 512 is associated with a different one of several cellular carriers or network providers and requires a separate dedicated modem setting or configuration. Each cellular network 510, 512 includes one or more cell sites which can re-transmit received signals.

The information management system 580 functions as a central monitoring station which periodically receives status reports from the various vending machines 520, 540 and 560 which it is able to communicate with via the dedicated modem and processes the received information. The information management system 580 can also request status reports from the vending machines 520, 540 and 560, and can instruct the vending machines to perform other functions, such as switching from one cellular carrier to another and modifying software code in the vending machine. As shown in FIG. 5, the information management system 580 includes a modem 582 and a computer 584.

As seen, there are several prior art systems/patents that relate to vending machine inventory management. However, I have determined that inventory management in the above-referenced prior art patents generally relates to the ability of machine owners and/or route attendants to efficiently service and/or monitor inventory levels of individual machines. The above prior art patents, therefore, do not concern or relate to the problem that I have realized of ascertaining en masse consumer purchasing habits from data aggregated from a plurality of vending machines over, for example, a disparate geographic area, let alone offer a solution to the problem. I have also determined that different machines have different data interfaces, and/or utilize different data formats, that prevent the aggregation of data from different machines. I have also realized that accurate and/or meaningful data collection techniques are absent because of this inability to collect potentially disparate and/or complimentary data from disparate machines and/or machine interfaces and/or machine data formats.

There is presently no known system or method of collecting and aggregating sales data from a plurality of vending machines, wherein the collected data is transmitted over one or more wireless and/or conventional networks. Further, known vending machine data machine collection systems and methods also do not aggregate the data collected from each of a plurality of vending machines, and thus do not permit such data to be mined to determine, for example, en masse consumer purchasing and/or buying/brand preferences.

Therefore, there is a need for a system and method that advantageously enables data to be collected from a plurality of vending machines, wherein such data can be aggregated and collectively mined and/or statistically analyzed to determine consumer purchasing and/or buying preferences. In addition, there is the need to collect data from machines having different data interfaces and/or data formats in a central location, to thereby be able to aggregate and compare the data and data that is indicative of similar trends, etc. Thus, I have also determined that there is the need to aggregate data that, for example, is not specific to a particular brand, but is common across brands. As will be described below, this has unique advantages, particularly in determining overall trends for products/services in a particular industry.

SUMMARY OF THE INVENTION

It is a feature and advantage of the present invention to enable data to be aggregated in a central repository from each of a plurality of vending machines.

It is another feature and advantage of the present invention to enable the data to be aggregated in such a way as to enable data mining and/or statistical analyses to be performed on the aggregated data.

It is yet another feature and advantage of the present invention to enable the aggregated data to be mined to determine en masse consumer purchasing habits and/or buying/brand preferences.

It is still another feature and advantage of the present invention to allow a third party to access via the Internet or other network the aggregated data to perform statistical analyses and/or mine the data.

It is another feature and advantage of the present invention to provide vending machine advertising based, for example, on current inventory of a particular machine and/or statistical analysis of the aggregated data.

It is another feature and advantage of the present invention to provide improved brand tracking and increased sales due to improved demand analysis.

It is another feature and advantage of the present invention to provide for lower vending machine operating costs due to, for example, just in time inventory analysis.

It is another feature and advantage of the present invention to provide for reduced down time and improved service level.

It is another feature and advantage of the present invention to sell at least a portion of the aggregated data to a third party.

It is another feature and advantage of the present invention to offer a discounted network rate to a third party when the third party accesses and/or purchases at least a portion of the aggregated data.

The present invention provides a system and method for an industry-wide solution for banked vending machines, or a plurality of vending machines that obtain, collect, and/or accumulate data. One embodiment uses Local Area Network/Wide Area Network (LAN/WAN) smart modem technology to collect data from a plurality of vending machines and transmit the data via either a terrestrial or satellite network or via the Internet to a central computer.

One aspect of the invention is becoming an application service provider. The present invention provides a system whereby a terrestrial wireless network, for example, is operatively communicable with a central computer that can serve, for example, as a master data base. The central computer, in turn, is operatively communicable with one or more Internet servers that, in one embodiment, are branded by the back end software manufacturers. For example, Computer Associates Unicenter TNG® software may be running on one server, whereas SX7 software by Rutherford & Associate may be running on another server. Additional inventory analysis and/or statistical analysis or related software application programs and/or packages may be running on additional servers. This configuration enables the data repository to be mined (i.e., data mining) and/or statistically analyzed. Third parties can thus access the data repository to conduct their own data mining and/or statistical studies. This will enable vendors to determine, for example, what products are selling and what sectors are regional, optionally, independent of a specific brand of product. Demographic data/information such as what types of hotels people stay in and or what hotels sell what types of goods. Any protocol conversions, data conversions, encryption and/or decompression of the data, in one preferred embodiment, will be done prior to entering the data in the central data base. The data may also be sold to third parties. Vendors who access the database may also be offered subsidized air time over, for example, a terrestrial wireless network over which the data flows.

The present invention can also provide aural and/or visual advertising to vending machines based on the analyzed data.

In one embodiment, in the event a purchase uses a credit card, the advertising can be targeted based on the user profile. In another embodiment, when a credit card is not used, advertising, as determined at least in part by analysis of the aggregated data, can be based on, for example, the location, time of day, and/or sales that have occurred during a previous predetermined time period (e.g., hour, day, week, month, etc.). In yet another embodiment, advertising information, as determined at least in part by analysis of the aggregated data, can be downloaded at predetermined times (e.g., low usage rates) or at times corresponding to a predetermined level of network traffic (e.g., low network traffic). In still another embodiment, machine owners can specify, as determined at least in part by analysis of the aggregated data, an advertising message that is transmitted to a plurality of machines. In still another embodiment, advertising information, as determined at least in part by analysis of the aggregated data, can be downloaded to one or more vending machines within a predetermined time period (e.g., sometime in the next 72 hours) and be displayed or audibly played for a predetermined period of time (e.g., 24 hours). The network may optionally include a dedicated distribution server to provide the desired advertising to the vending machines.

In general, the invention is not limited to having the data collected from only vending machines. The central server can receive and aggregate data from various different sources and/or industries and different applications.

In the vending machine context, data can be collected, for example, pertaining to: machine serial number, machine model, machine address, machine route number, machine owner, product/service sold, sales price, currency/paper money tendered, change provided, date and/or time of purchase, length of time product in machine, and/or number of products remaining in machine. Other data and/or information can also be collected and stored.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein:

FIG. 9E is a second block diagram illustrating the elements contained in a vending machine data aggregation system for a fifth embodiment of the present invention illustrating an intelligent routing feature;

The same reference numerals refer to the same parts through the various figures.

DETAILED DESCRIPTION OF A PREFERRED EMBODIMENT OF THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 6:
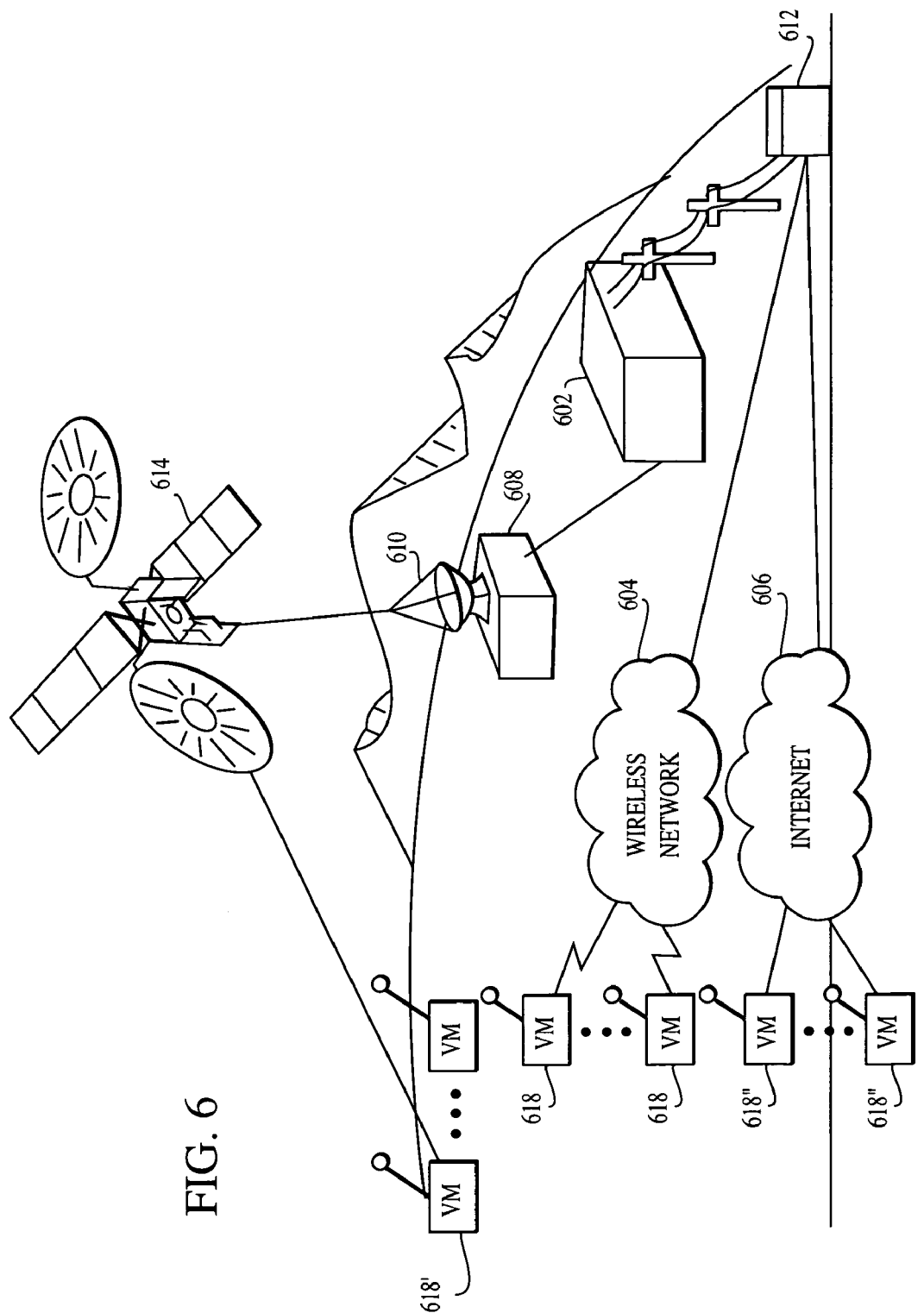
FIG. 6 is a schematically simplified representation of the overall vending machine data aggregation system.

FIG. 6 illustrates the general layout of a system for effectuating the present invention. A plurality of commercially available vending machines 618, 618', 618" are shown. The vending machines 618, 618', 618" may, for example, have an internal configuration similar to that shown in FIG. 1. Each of the vending machines 618, 618', 618" transmit data to the central computer 612 via a different transmission path. Vending machines 618 transmit data regarding machine inventory and/or sales of goods to a central computer 612 via a terrestrial wireless network 604. Vending machines 618' transmit data regarding machine inventory and/or sales of goods to a central computer 612 via a satellite network comprised of, for example, satellite 614, ground station 608 having a receiving antenna 610, and a relay base 602. The ground station 608 transfers the data received to central computer 612 via relay base 602. Finally, vending machines 618" transmit data to the central computer 612 via a network such as the Internet 606. Any suitable data transmission protocol or combination of protocols can be used to transmit data from the vending machines 618, 618', 618" via the respective network(s) to the central computer 612. Alternatively, as described below, in another embodiment of the invention, alternate land-line networks, such as cable networks with cable modems may be used. As yet another alternative embodiment, some of the machines include a communication device or modem as described in U.S. Pat. No. 5,953,319, incorporated herein by reference, that allows, for example, least cost routing of the data based upon predetermined criteria, such as cost, congestion, etc.

Figure 7:
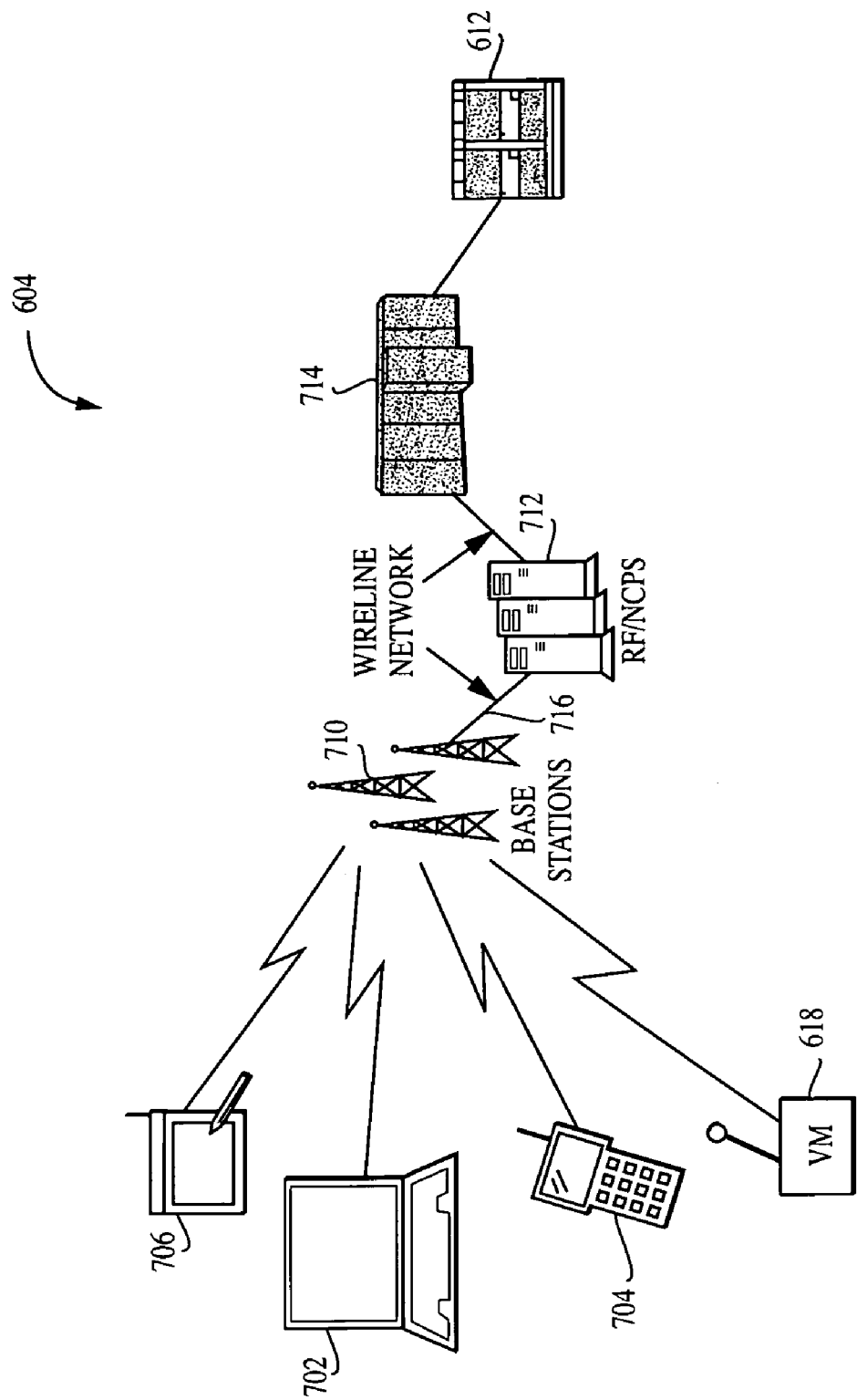
FIG. 7 is a schematically simplified representation of the Motient$^{SM}$ terrestrial communications network.

In accordance with the present invention, it is preferred that for terrestrial transmission a network such as the Motient$^{SM}$ network 604 shown in FIG. 7 be utilized. Terrestrial networks of this nature provide secure, portable, two-way communication between, for example, wireless data terminals, mobile data terminals, and non information technology devices such as vending machines 618 when they are equipped with suitable modems and interfaces.

The Motient$^{SM}$ network 604 is a terrestrial wireless two-way data network that is based on Motorola's RD-LAP technology. It was originally developed and jointly owned by Motorola and IBM. In 1995 Motorola acquired 100 percent ownership of what was then called the ARDIS® (Advanced Radio Data Information Services) network. In 1998, ARDIS was acquired by American Mobile Satellite Corporation (now Motient Corporation).

The Motient$^{SM}$ network 604 covers at least ninety percent of the urban business population and more than 400 metropolitan area in the United States, Puerto Rico and the Virgin Islands. Two proprietary air-interface protocols have been developed for the network 604. The MDC-4800 protocol provides a 4800 bit/sec service, and the RD-LAP protocol provides a 19.2 kbit/sec service.

The network 604 allows subscriber units such as an intelligent terminal or computing device 702, handheld device 704, other communications device 706, or a vending machine 618 having a suitable interface to the network 604 to communicate with and/or transmit data to their respective computer 612 without a phone line connection. Subscriber units 618, 702, 704, 706 therefore, typically have a radio frequency (RF) modem for sending and receiving signals. The RF modem utilizes the MDC-4800 and/or RD-LAP protocols to enable to subscriber units to gain access to the Motient$^{SM}$ network 604. In the event the a network other than the Motient$^{SM}$ network 604 is utilized, other air-interface communication protocols may be used. For example, if a MOBITEX network 604 is used, the air-interface protocol would be Gaussian minimum shift keying (GMSK).

The network 604 has over 1750 base stations (710) that provide service throughout the United States, Puerto Rico, and U.S. Virgin Islands. Each base station 710 covers a radius of approximately 15–20 miles. The base stations 710 are radio frequency towers that transmit or receive radio signals between subscriber units 618, 702, 704, 706 and the Radio Frequency/Network Control Processors (RF/NCPs) 712. Base stations 710 transmit and receive radio signals, preferably using a narrow band FM transmitter and receiver operating in the 800 MHz frequency band. There are separate frequencies for the transmit path and the receive path; together these two frequencies represent a full duplex channel that normally transmits data at 4800 bps in both directions.

In operation, for a message "inbound" to the network 604 from a subscriber unit 618, 702, 704, 706, the signal is "heard" by the base stations 710 and sent over dedicated leased lines 716 to a RF/NCP 712. The network 604 employs an automated roaming capability that allows the free movement of subscriber units 702, 704, 706 between cities and between multiple channels within a given city. This feature is not, of course, generally relevant to a subscriber unit such as a vending machine 618 due to their relative immobility. This capability allows the subscriber units 702, 704, 706 to freely move (roam) across the country and take advantage of all the network 700 services that are available in every locale.

The RF/NCPs 712 are high-speed computers that interconnect multiple base stations 710 with the ARDIS® Connect Engine(s) (ACEs) 714. A number of RF/NCPs 712 are located together serving a particular geographical area, each being connected by high speed digital phone service to one of the ACEs 714, which route messages to a destination such as a customer host computer 708 that is directly connected to the network 700 by, for example, a leased telephone line or a value added network.

RF/NCPs 712 manage the RF resources, including the base stations 710 and data sent over the radio channels. Both inbound and outbound channels are managed using different delivery strategies. The RF/NCPs 712 evaluate the strength of the signal received from every wireless device transmission at each base station for each detected inbound data packet. That RF/NCP then selects the best base station 710 to communicate with that particular wireless device and will send the next outbound message through that base station.

The RF/NCPs 712 also help manage the roaming capability of the network 604. Subscriber units 618, 702, 704, 706 can automatically move (roam) between any of the network 604 frequencies on either of the two protocols (MDC 4800 and RD-LAP 19.2), or between any of the configured network 604 layers that have been configured for in-building or on-street usage. Through periodic transmission of "channel market messages," each subscriber unit 618, 702, 704 706 is provided with the most efficient service available in that area. Each RF/NCP 712 also passes information, via a high speed digital line, relating to source, destination and length of each message to an ACE 714 that enables the network 604 to do network analysis of traffic density at each base station 710.

An ACE 714, in turn, passes information back to a RF/NCP 712 concerning whether the subscriber unit 618, 702, 704, 706 is properly registered to the network 604 and, if so, what level of service of provided to the respective subscriber 618, 702, 704, 706. The ACEs 714 are general purpose computers that act as the heart of the network 700. The ACEs 714 route messages to the proper destination, store subscriber registration information including entitlement, and perform accounting and billing functions. The ACEs 714 also serve as a point of connectivity to, for example, computer 612, perform protocol conversion, and perform network 604 troubleshooting and test functions. A plurality of ACEs 714 are interconnected through dedicated leased lines, with alternate paths available from each switch as a contingency measure against line interruptions. The linking between computer 612 and an ACE 714 is generally accomplished using asynchronous, bisynchronous, Systems Network Architecture (SNA), or X.25 dedicated circuits.

The wireline network 716 provides communication between the customer host computers 708, the ACEs 714, the RF/NCPs 712, and the base stations 710. The wireline network 716 is equipped with sophisticated communications equipment that relays customer messages. This equipment includes intelligent multiplexers, leased telephone circuits, high-speed modems or digital service units, and modems for both RF/NCP 712 and computer 612 connectivity.

Inside every cell, the subscriber units 618, 702, 704, 706 access the network 604 using a random access method called data sense multiple access (DSMA). Before every transmission, a subscriber unit 618, 702, 704, 706 listens to a base station 710 to determine if the base station is busy. The subscriber units are allowed to transmit only when a base station 710 is not busy.

Figure 8:
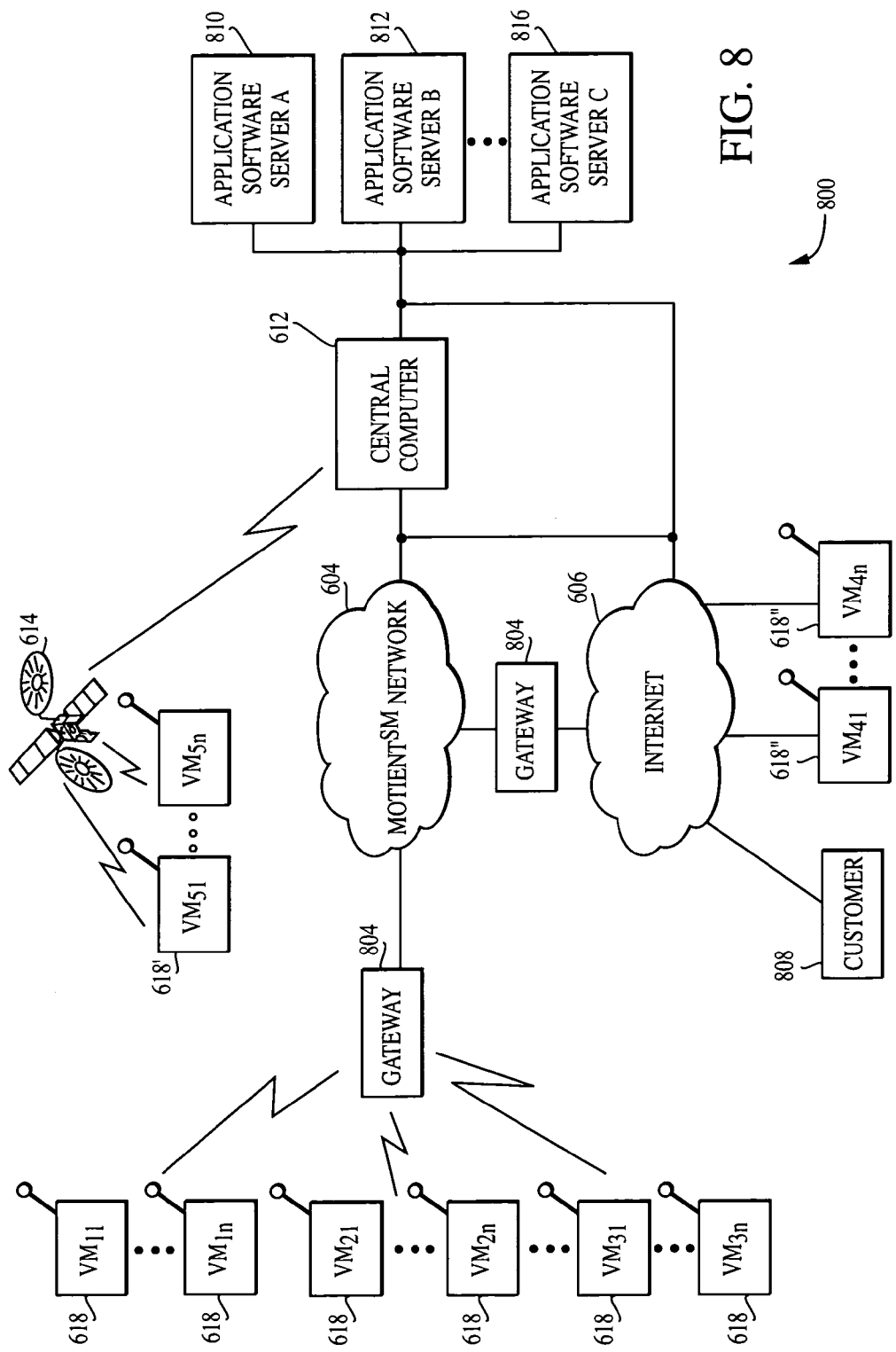
FIG. 8 is a high level block diagram of the vending machine data aggregation system.

FIG. 8 shows a simplified block diagram of the data aggregation system 800 in accordance with one embodiment of the present invention. In this embodiment the system 800 is shown in the context of collecting data from vending machines 618, 618', 618". In general, the system 800 is not limited to collecting data from vending machines 618, 618', 618". The central computer 612 can receive and aggregate data from various different sources and/or industries and different applications.

As shown, and as previously discussed with regard to FIG. 6, there are four primary ways by which vending machine data can be transmitted to the central computer 612: by a terrestrial network 604, by the Internet 606 or similar network, by a satellite 614 transmission, and/or by land-line network (not shown). When data is sent via a terrestrial network 604, an interface to the network 604 is provided. In general, connectivity components to the network 604 are the communication interfaces to the network 604 from software/hardware. On the client side (e.g., vending machine 618), it may include, for example, a layer of communication software which stands between, for example, a client application program and a wireless modem. It also includes protocols needed to interface with the network 604.

On the server side (e.g., central computer 612) it may include, for example, a data line and hardware components (e.g., an X.3 packet assembler/disassembler (PAD), which is a communications device that formats outgoing data into packets of the required length for transmission in a packet switching network, and strips the data out of incoming packets), along with the communications software and protocols to send data from and to the network 604. In the case of the present invention, the connectivity components may be custom created, or they may be purchased from a wireless provider and configured for a specific application.

In the case of the Motient$^{SM}$ network 604, a client-network interface can be provided, for example, at either the vending machine 618 by, for example, a modem (not shown) and associated communication software, or external to the vending machine via a suitable gateway 804. The interface ensures that the data transmitted by the vending machine 618 is and "understood" by the network 604.

In the case of a wireless modem, cStar Technologies, Inc., Toronto, Ontario, Canada, for example, manufactures the SkyGate™ DTC-1000 model wireless modem, which provides both an interface to the vending machine 618 as well as a modem-network interface. The DTC-1000 model provides a Motorola DataTAC® network interface and Native Control Language (NCL)/DataTAC® Messaging network protocol, thus enabling a vending machine 618 to operatively communicate with a base station 710. The SkyGate™ DTC-1000 model also operatively connects with the vending machine 618 to collect vending machine sales and/or inventory data and subsequently transmit the data to the central computer 612 via the Motient$^{SM}$ network 612. The modem also allows the Motient$^{SM}$ network 612 to send, for example, advertising data or other information to the vending machine 618.

An interface external to the vending machine 618 can advantageously also be provided by, for example, a gateway device 804 that converts a native transmission protocol and/or data format used by the vending machine 618 (i.e., the modem used by the vending machine) to that of the network 604 and/or to a common format for data processing, since different machines may use the same transmission protocol but different data formats that provide different results or data regarding the characteristics of the machine. For example, different data formats may order/sequence the data differently, and/or use different symbols used indicative of, for example, quantity of product sold, and the like. It is preferred that the gateway 804 be either co-located with or in close proximity to a first receiving device used to gain entry to the network 604. In the case of the Motient$^{SM}$ network 604, this would be a base station 710, as shown in FIG. 7. Further information pertaining to the Motient$^{SM}$ network and/or providing an interface to the network 604 can be found in the following documents: *DataTAC Wireless Data Networks: Application Development Guide* (Doc. No. 6804111L20-A), First Edition, November 1997; *DataTAC Open Protocol Specifications Standard Context Routing Release* 1.0 (Doc. No. 68P04025C20-A), November 1995); *ARDIS DataTAC* 4000 *Software Developers Reference Guide*, Revision 2.0, January 1997. Each of the aforementioned documents are incorporated herein by reference in their entirety. Copies of these documents are submitted herewith.

When data is sent via the Internet 606, a vending machine-network interface is preferably provided at either the vending machine 618" or external to the vending machine via a suitable gateway 804. When the interface is provided at the vending machine 618, a wireless modem such as the cStar Technologies, Inc., Toronto, Ontario, Canada, SkyGate™ DTC-1000 model can again be used. The SkyGate™ DTC-1000 provides, for example, a CCITT ((Comité Consultatif International Téléphonique et Télégraphique), now known as the ITU (International Telecommunication Union), the CCITT's parent organization) V.34 standard connection for a standard landline modem. Vending machines 618" can thus be connected to the network 604 via the Internet 606. An Internet-network interface is provided by and built into the Motient$^{SM}$ network. That is, once vending machines 618" are suitably equipped to transmit data via the Internet 606, that information can also be transferred to the central computer 612 via the network 604.

Finally, a satellite 614 transmission can also be used in conjunction with vending machines 618'. This transmission is preferably provided directly via the vending machine(s) 618' to the central computer 612, although suitable gateways 804 may optionally be provided as desired and/or required.

The central computer 612 is preferably a DirectGate™ series 900 communication server also sold by cStar Technologies, Inc. The DirectGate™ provides high-performance aggregation, multi protocol conversion, switching and routing of both high-speed and low-speed applications while increasing bandwidth utilization, expanding actual channel throughput, enhancing communication security and reducing overall communication costs. The DirectGate™ is also equipped with the cStar Inc. Wireless Transport Protocol™, which can provide direct satellite 614 connectivity for satellite 614 transmissions as discussed above.

The central computer 612 will, upon receiving data from vending machines 618, 618', 618", parse the data and store it in a standard format, each in accordance with any number of suitable techniques well known in the art. Any number of commercially available relational database products can be used to store the data. Such products include Microsoft Access, Paradox by Borland International, or relational database software by Oracle Corporation.

It is also preferred that one or more application software servers 810, 812, 816 be operatively connected to the central computer 612. Each application software server 810, 812, 816 preferably runs a statistical software package from a particular vendor. For example, server 810 may run SX7 software by Rutherford & Associates, Holland, Mich., which can be used to conduct sales analyses for any time period by customer, machine and model, and/or geographic area. On-screen analyses can also be conducted regarding product profitability, machine profitability and/or route profitability. Similarly, server 812 may, for example, have installed thereon and run Computer Associates Unicenter TNG® software, which allows customers to, for example, monitor and manage vending machines 618, 618' and 618". Other similar software packages may also be utilized to analyze the aggregated data.

Figure 9A:
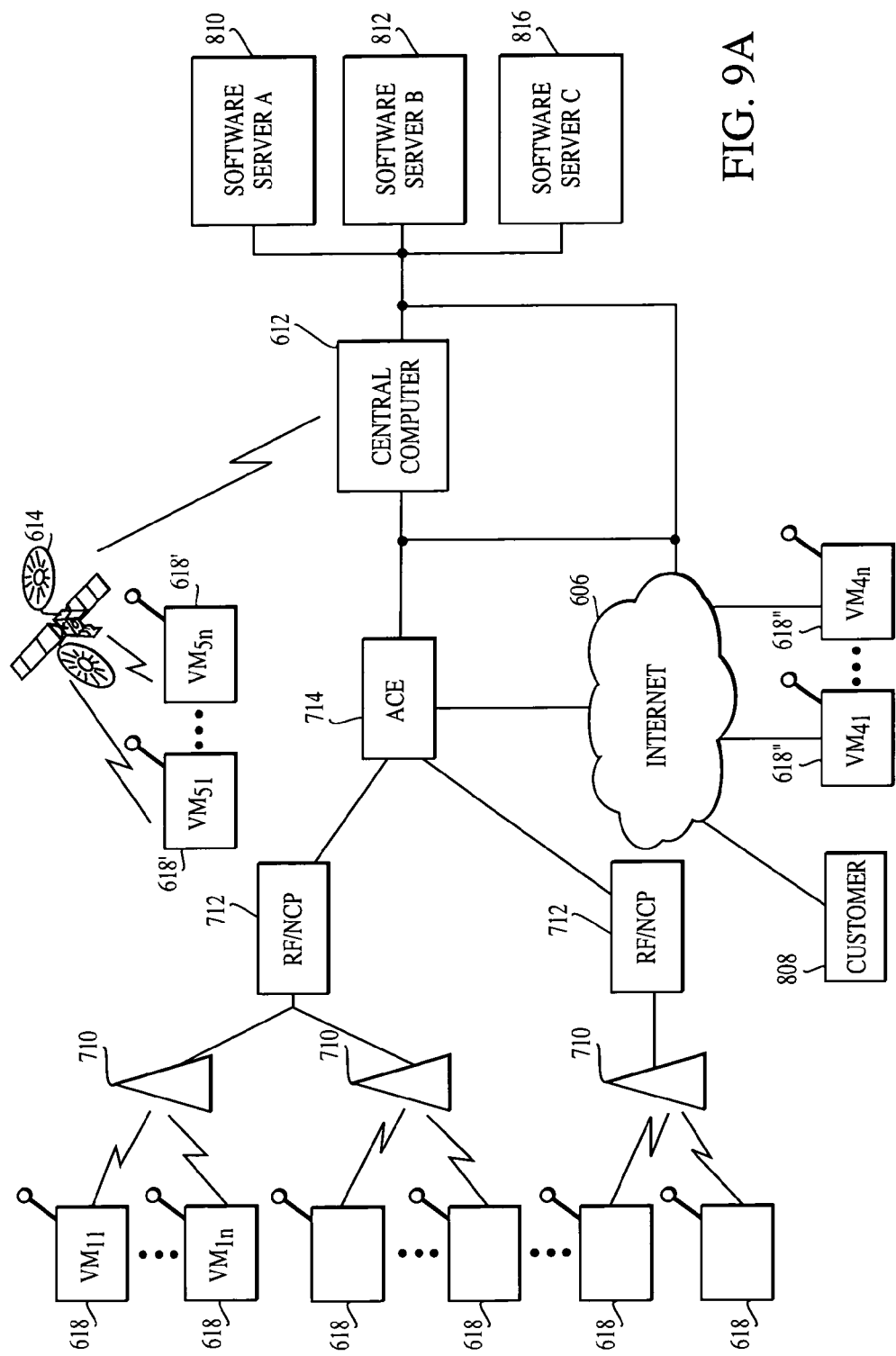
FIG. 9A is a block diagram illustrating the elements contained in a vending machine data aggregation system for one embodiment of the present invention.

Examples of data that may be collected from the vending machines, and statistically analyzed to assist in providing and/or determining, for example, increased sales, improved brand and/or product category tracking and/or improved demand analysis, are:

1. Machine Serial Number
2. Machine Model
3. Machine Address
4. Machine Route Number
5. Machine Owner
6. Product Sold
7. Sales Price
8. Currency/paper money tendered
9. Change provided 10. Date and/or time of purchase
11. Length of time product in machine
12. Number of products remaining in machine
13. Class of product
14. Related products sold/remaining FIG. 9A shows an integrated block diagram of the Motient$^{SM}$ network 604 with the data aggregation system 800 shown in FIG. 8. As shown, the base stations 710 are the entry point into the Motient$^{SM}$ network 604. The central computer 612 is preferably connected to ACE 714. Internet 606 connectivity is provided to the Motient$^{SM}$ network 604 via the same or different ACE.

Figure 9B:
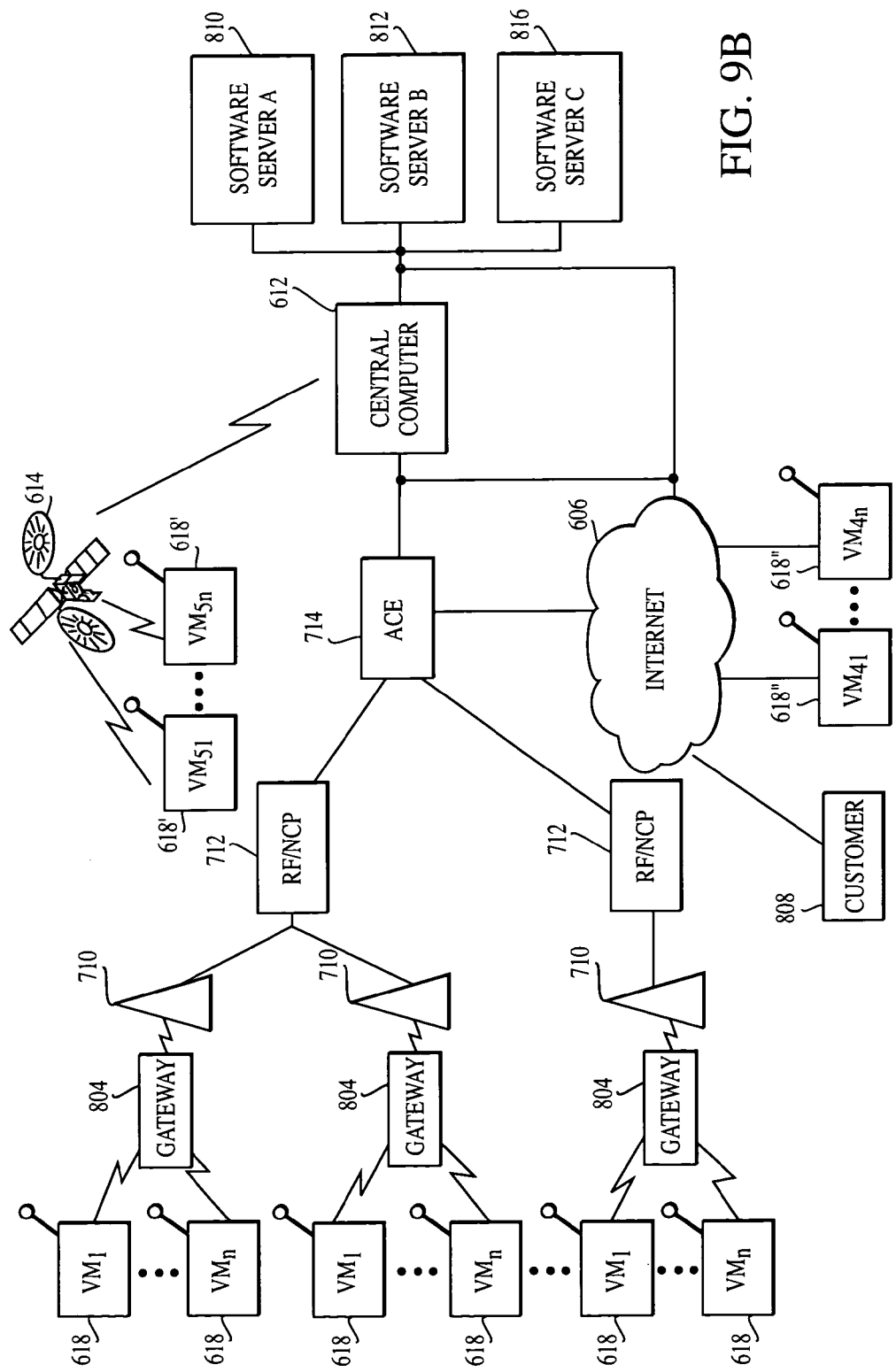
FIG. 9B is a block diagram illustrating the elements contained in a vending machine data aggregation system for a second embodiment of the present invention.

FIG. 9B shows a second integrated block diagram of the Motient$^{SM}$ network wherein the interface to the network 604 is provided external to the vending machines 618. Here, the RF modem used by the vending machine 618 is not compatible with the Motient$^{SM}$ network 604 (e.g., does not transmit using an RD-LAP or MCD 4800 protocol). Therefore, an external gateway 804 must be operatively communicable with the network 604. The gateway 804 is preferably, although not necessarily, co-located with a base station 710. The gateway(s) 810 in a preferred embodiment perform the typical/standard gateway function of translating the transmission protocol used, for example, by the vending machine 618 modem to, for example, either the RD-LAP or MDC-4800 protocol used by the Motient$^{SM}$ network 604. In the case that a network other then the Motient$^{SM}$ network 604 is used, the gateway(s) 810 would then translate the transmission protocol used, for example, by the vending machine 618 modem to, for example, the particular protocol used by the network.

Advantageously, in accordance with one embodiment of the present invention, the gateway 810 is provided to optionally convert the received data from a variety of data transmission protocols, and to convert or obtain the correct data from a variety of data formats that different machines may be using. For example, as illustrated in FIGS. 9E and 9F, while the same data is transmitted, a different data order is used. Thus, the gateway 810 is equipped with different data format protocols to accept the data in an appropriate manner. Alternatively, or in addition thereto, the gateway 810 includes the capability of receiving data having different formats, such as PS=# for one machine might be product sold, and for another machine PRODSOLD=# might be the data for the same data value. Accordingly, the gateway is equipped with, for example, a conversion table for each of the machines, providing its specific data format.

More particularly, as shown in FIG. 9E, a first data format is shown 900. The header field 904 is followed by a product sold field 908, which in turn is followed by an address field 910 and, finally, a price field 912. In FIG. 9F, the second data format 914 comprises a header field 916, followed by an address field 920, a price field 922, and finally, the product sold field 922. As indicated above, for each data format 900, 914, the gateway 804 will use one or more conversion tables to interpret each respective data format.

Figure 9C:
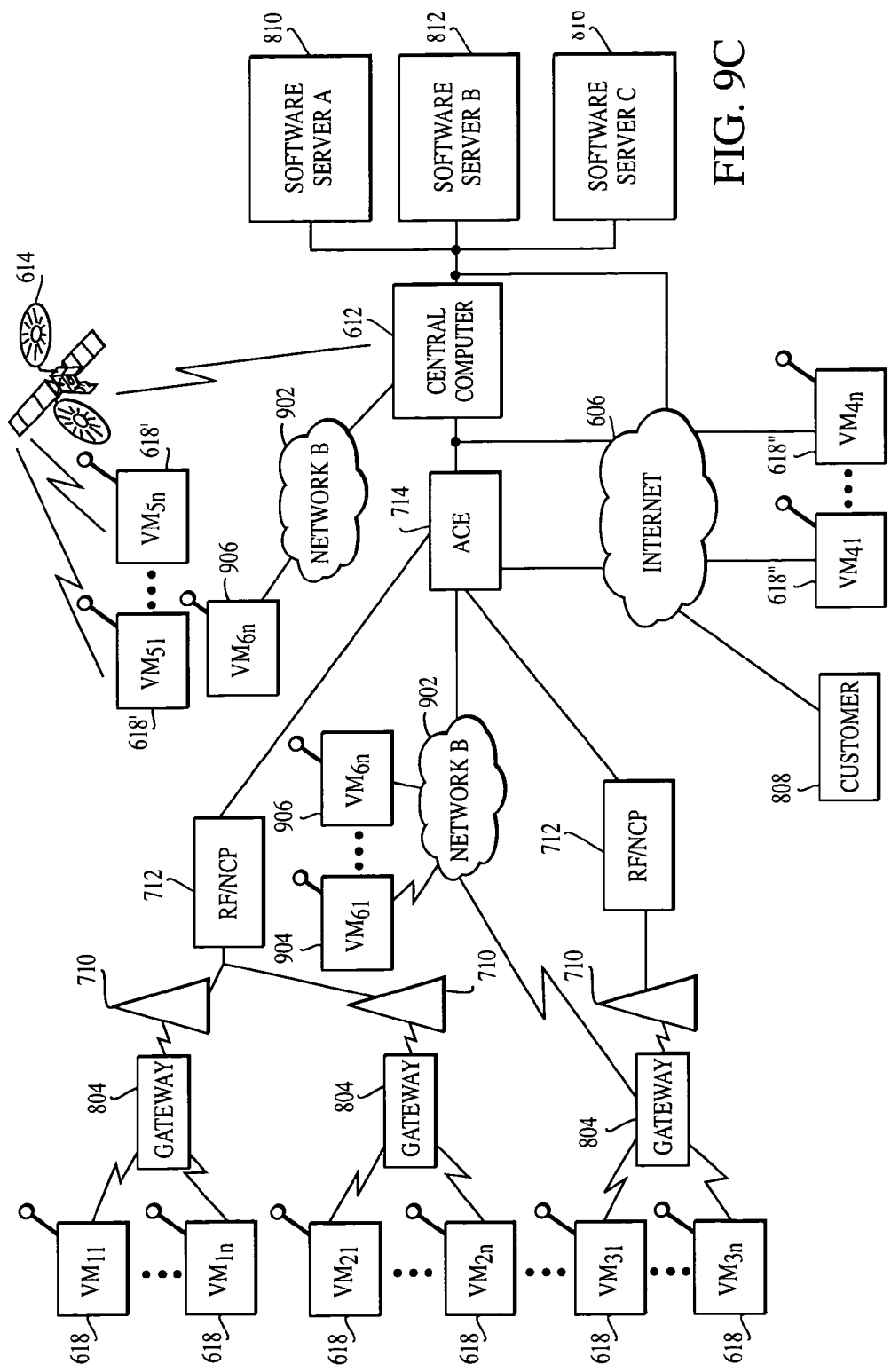
FIG. 9C is a block diagram illustrating the elements contained in a vending machine data aggregation system for a third embodiment of the present invention.

FIG. 9C shows a third integrated block diagram of the Motient$^{SM}$ network. FIG. 9C also shows that the Motient$^{SM}$ network 604 can also interface with and collect data initially transmitted from a vending machine 904, 906 via a second network (Network B) 902. As shown, vending machine 904 may initially transmit to Network B 902 via a wireless transmission, whereafter Network B may wirelessly transmit the data to, for example, gateway 804. Vending machine 906, for example, may transmit to Network B 902 via a land-line transmission, whereafter Network B transmits the data to ACE 714. Any protocol conversions, if necessary, may be performed at either ACE 714, or by providing a gateway 804 (not shown) between Network B 904 and ACE 714. Finally, Network B 902 may also transmit directly to central computer 612. As before, any protocol conversions, if necessary, may be performed at either central computer 612, or by providing a gateway 804 (not shown) between Network B 902 and central computer 612. It should be understood that any gateways 810 provided that interface between Network B 902 and the Motient$^{SM}$ network 604 preferably have a data format capability as discussed with regard to FIGS. 9E and 9F.

Figure 9D:
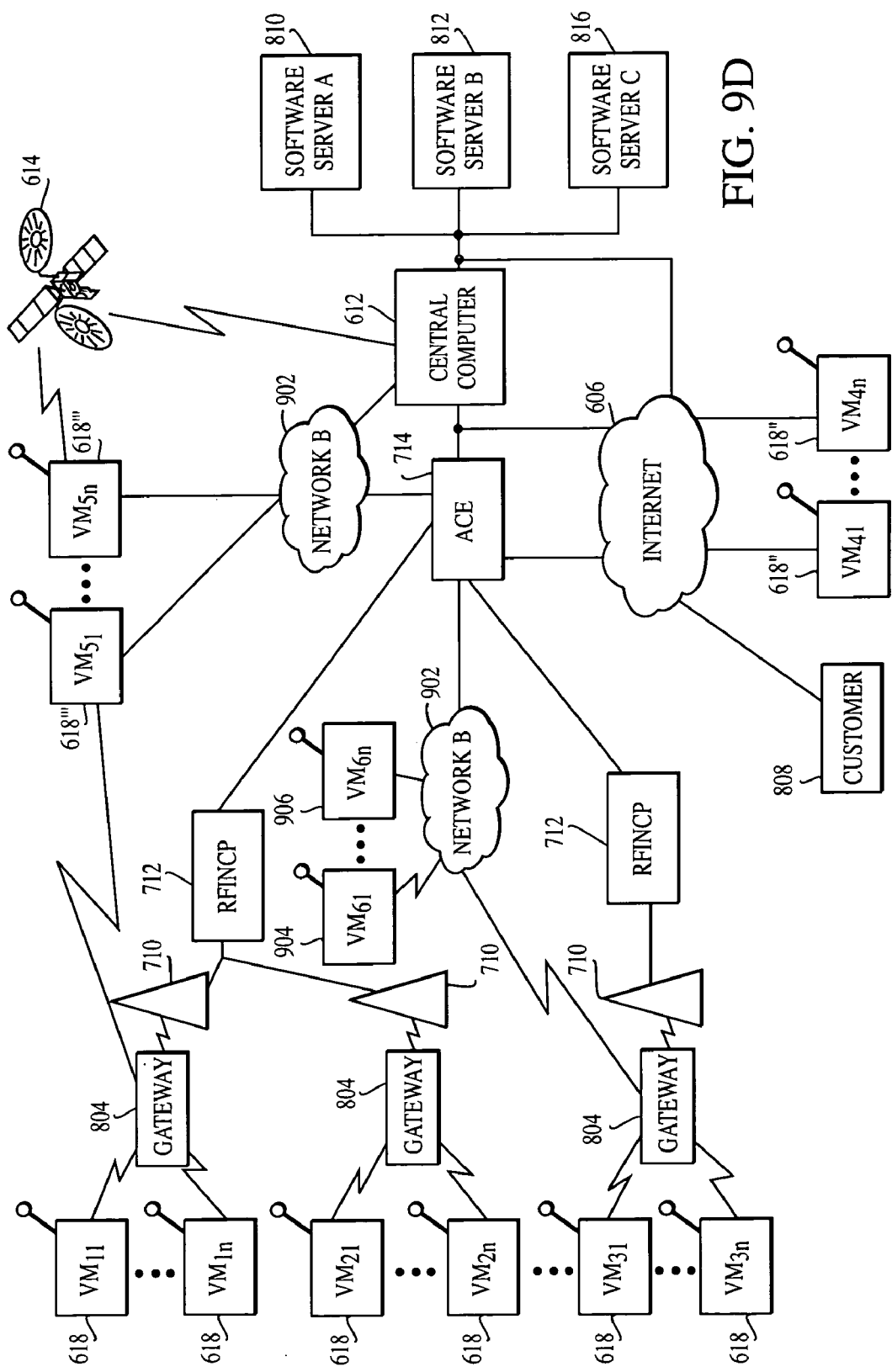
FIG. 9D is a block diagram illustrating the elements contained in a vending machine data aggregation system for a fourth embodiment of the present invention.
Figure 9F:
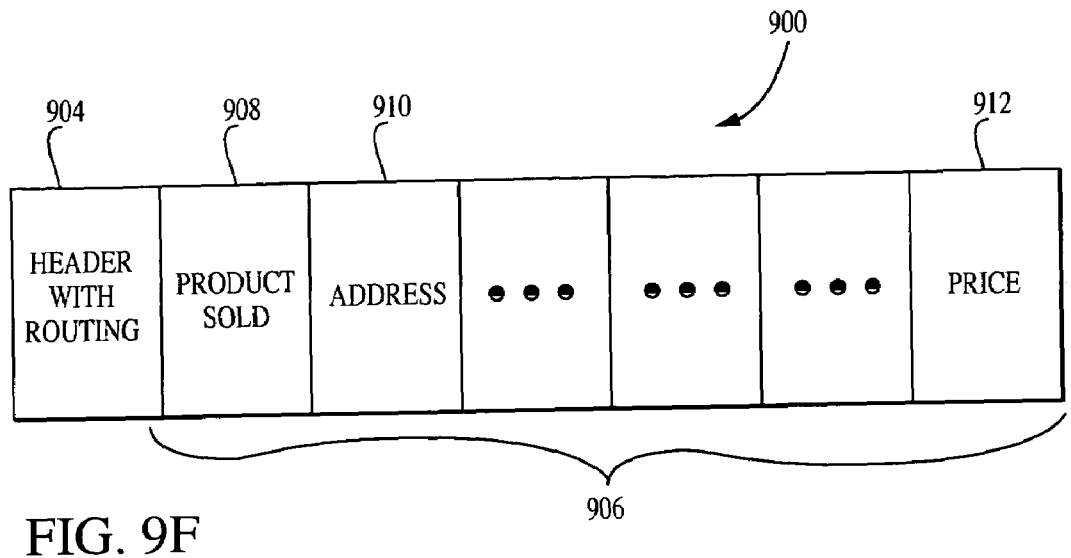
FIG. 9f shows an example of a first data format that may be transmitted by a vending machine.
Figure 9G:
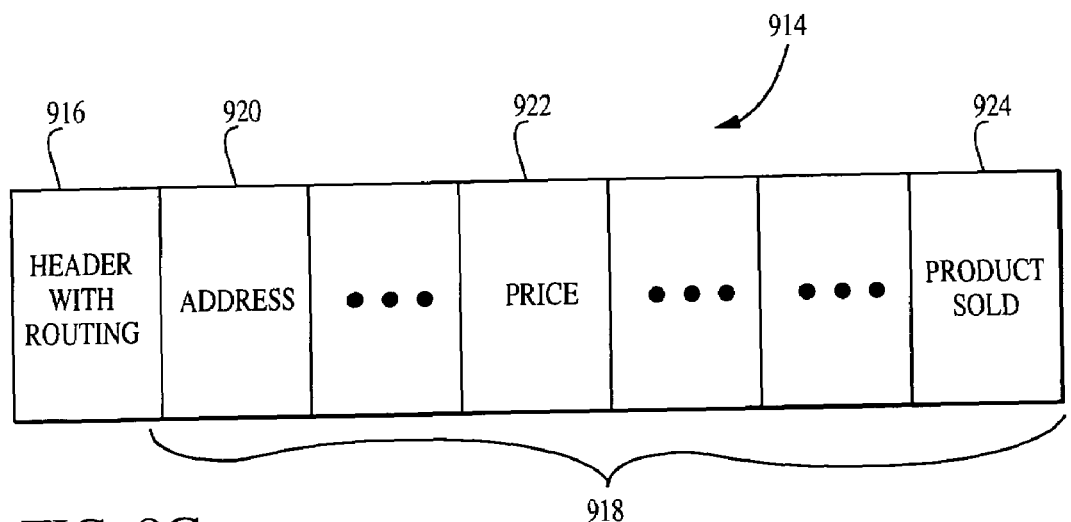
FIG. 9G shows an example of a second data format that may be transmitted by a vending machine.

FIG. 9D shows an embodiment wherein vending machines 618′′′ are equipped with an intelligent routing capability as disclosed in U.S. Pat. No. 5,953,319, which is incorporated herein by reference. The intelligent routing capability may be used to select, for example, one of the three shown transmission paths: the Motient$^{SM}$ network 604 via gateway 804, Network B 902, or satellite 614. The intelligent routing capability may be based on, for example, minimizing transmission cost and/or time, and the like.

FIG. 9E shows an alternative embodiment wherein vending machines 618, 618′, 618″ and 618′′′ are equipped with an intelligent routing capability 930 as disclosed in U.S. Pat. No. 5,953,319. The intelligent routing capability may be used to select, for example, one of the four shown transmission paths: the Motient$^{SM}$ network 604, satellite 614 transmission/network, the Internet 606, or landline 950 transmission/network. The intelligent routing capability 930 may select one of the four transmission networks based on, for example, minimizing transmission cost and/or time, and the like.

Figure 1:
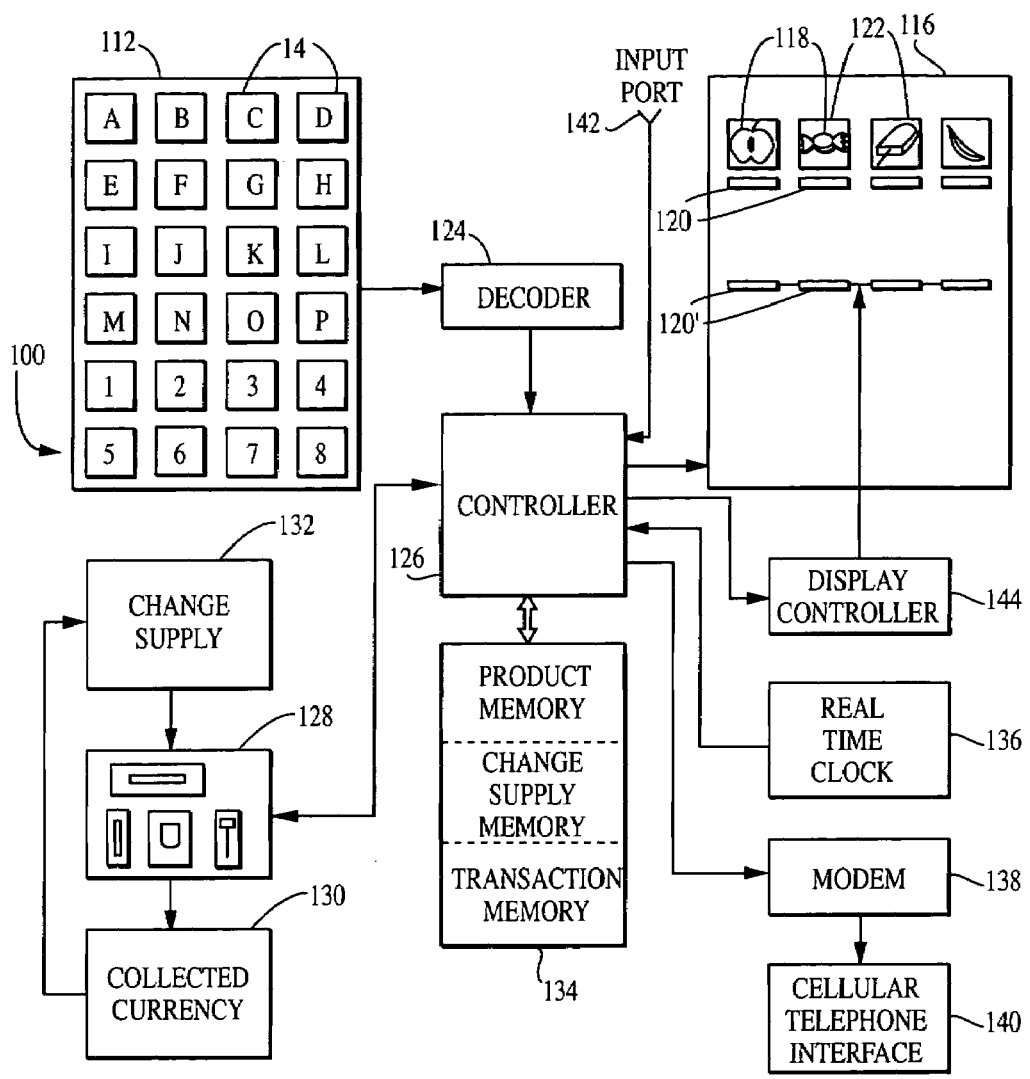
FIG. 1 is a schematic of a prior art block diagram of a vending machine inventory management system.
Figure 2:
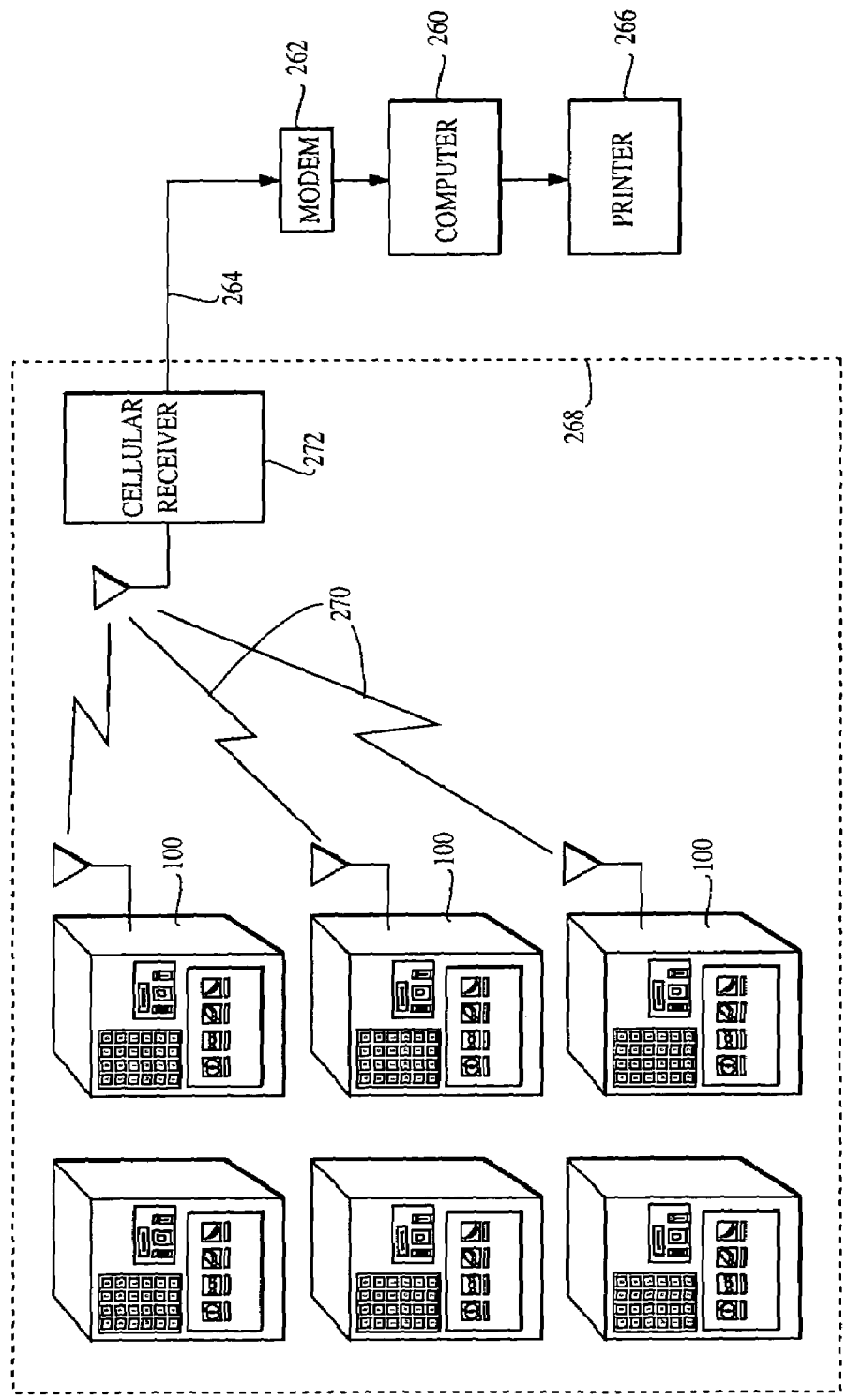
FIG. 2 is a block diagram of a system using the inventory management system of FIG. 1.
Figure 3:
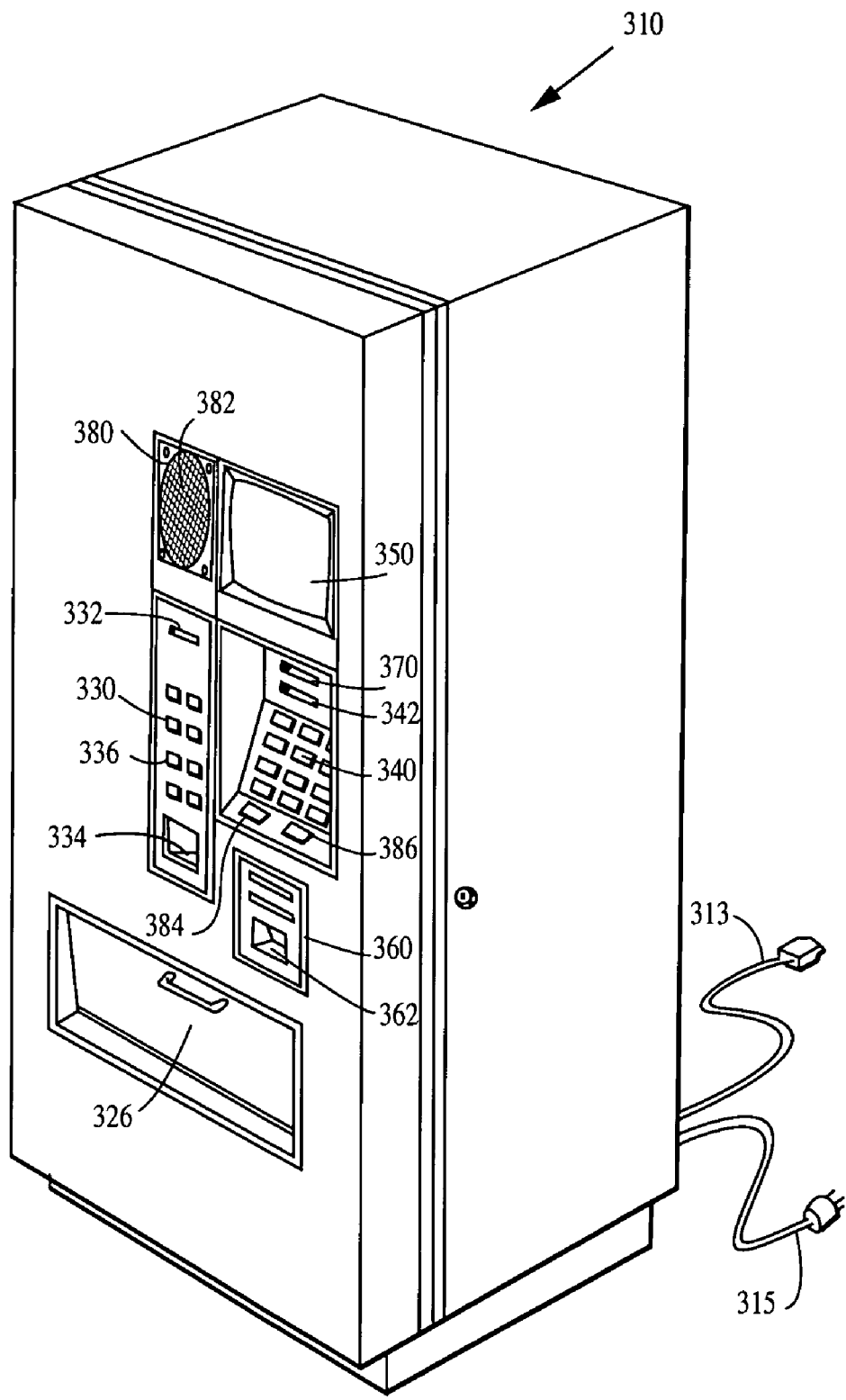
FIG. 3 is a perspective view of a prior art vending machine.
Figure 4:
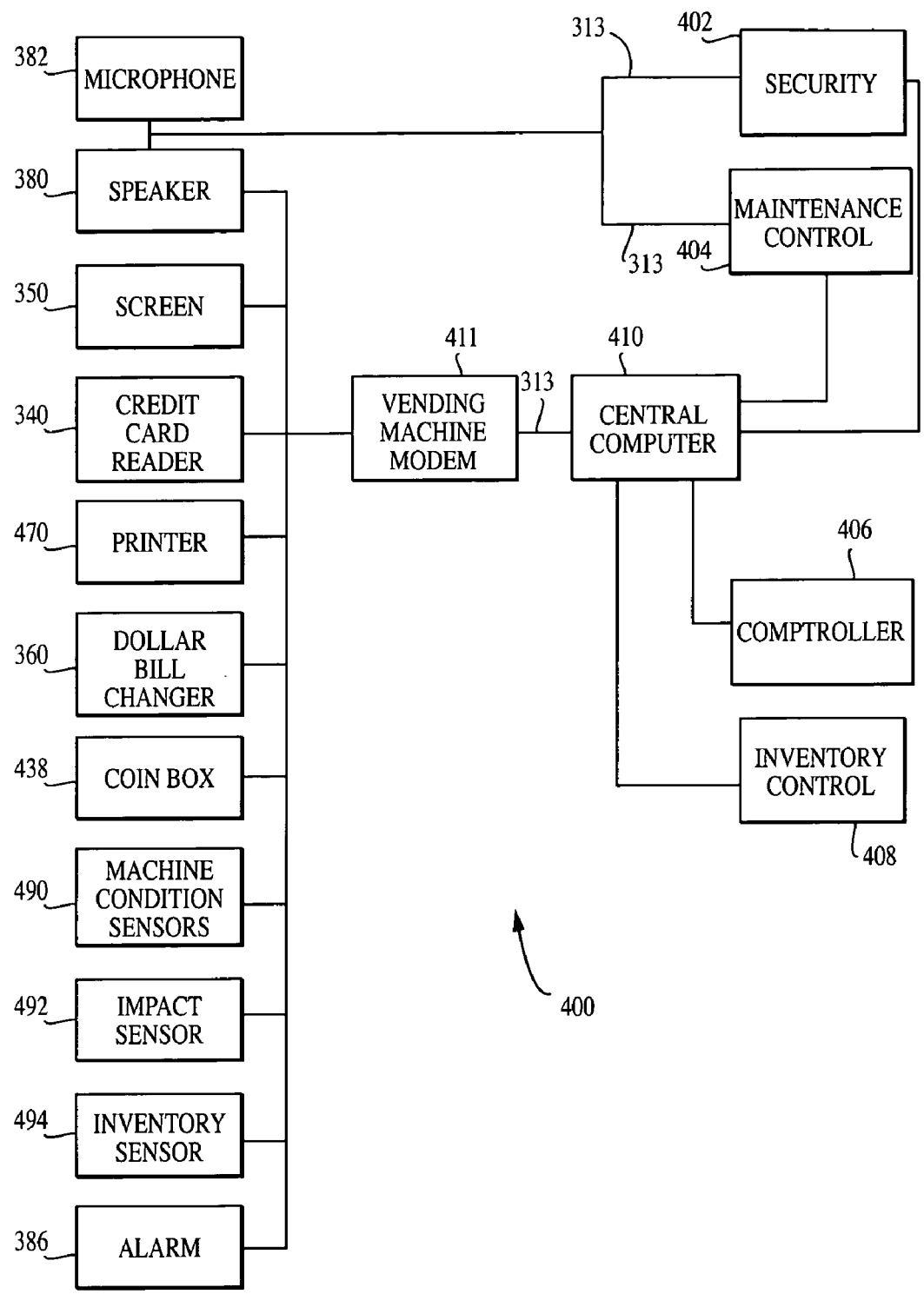
FIG. 4 is a schematic diagram of a prior art inventory and security system.
Figure 5:
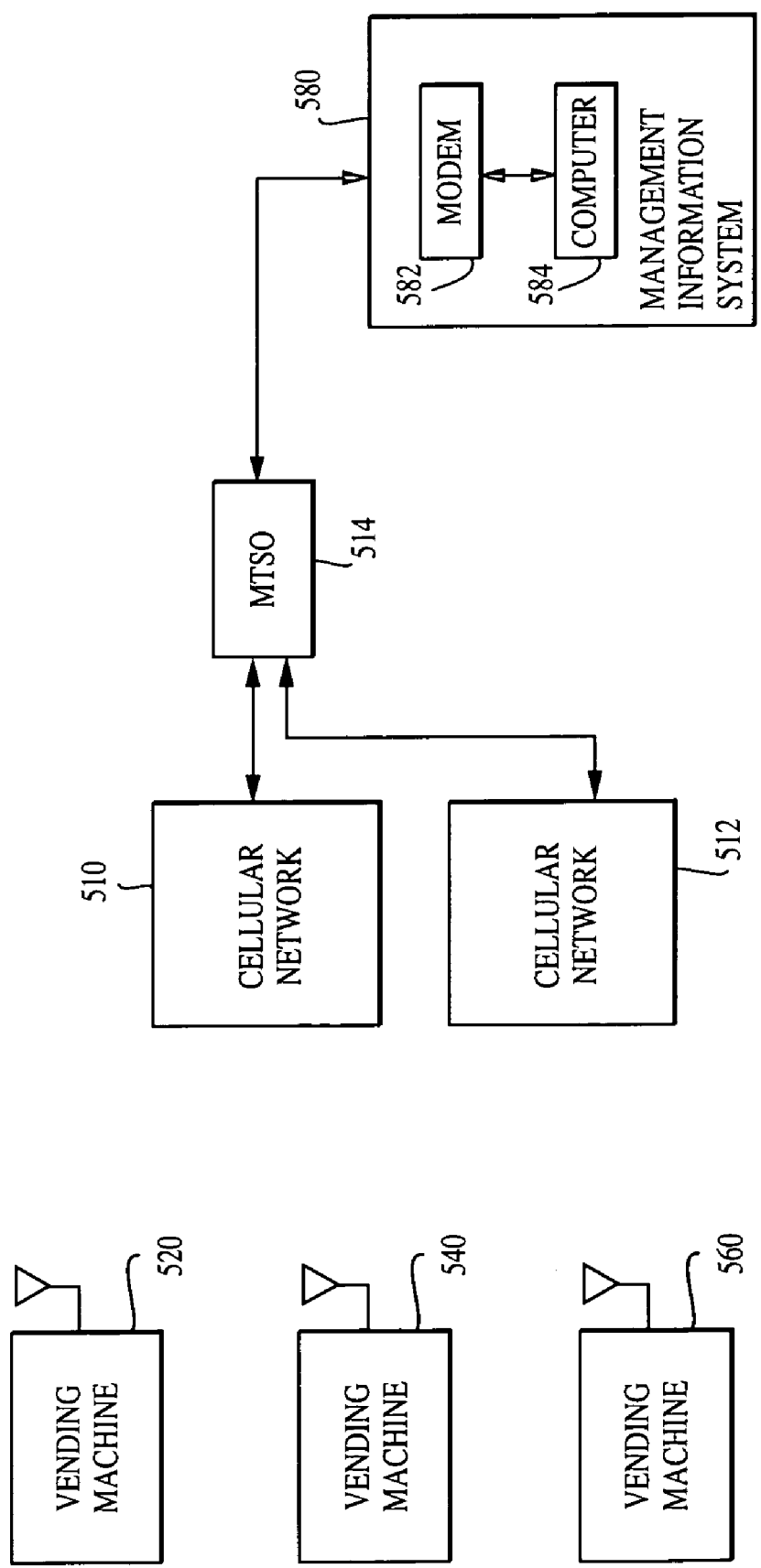
FIG. 5 is a block diagram of a prior art vending machine monitoring and reporting system.
Figure 10:
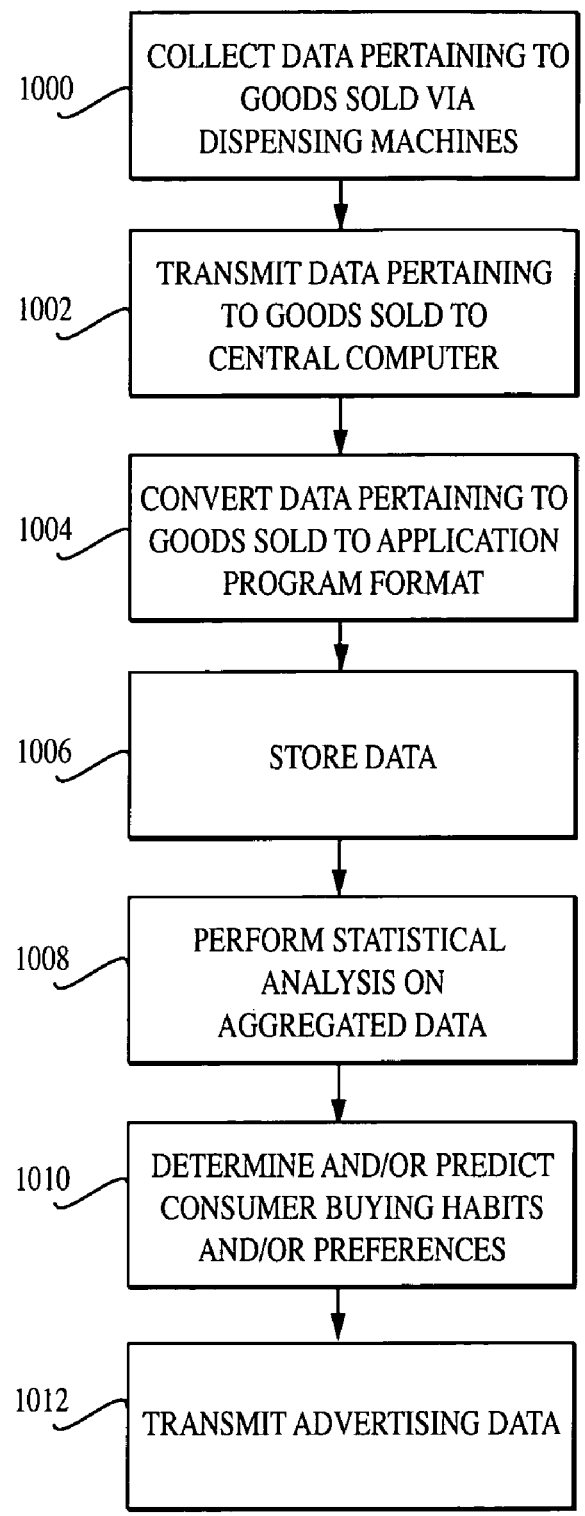
FIG. 10 is a high level flowchart of the computer implemented process for aggregating vending machine data in accordance with the present invention.

The method according to the present invention is shown in FIG. 10. In step 1000, data is collected pertaining goods sold in, for example, dispensing/vending machines 618, 618′, 618″. The data can be stored within the vending machines 618, 618′, 618″ in, for example, non-volatile memory 134 as shown in FIG. 1. In step 1002, the collected data is transmitted via a terrestrial wireless network 604, the Internet 606 and/or via a satellite 614 transmission to a central computer 612. In step 1004, the transmitted data is converted to a format that corresponds, for example, to one or more statistical/inventory analysis application programs as previously mentioned. Thus, the aggregated data stored in the central computer 612 may need to be converted to a file format associated and/or compatible with one or more of the application software programs residing on each respective server 810, 812, 816. In step 1006, the converted data is stored in one or more data files associated with each of the one or more application programs.

In step 1008, a third party, for example, accesses one or more of the data files, preferably using one or more application programs residing on at least one of the respective servers 810, 812, 816 that can be used to analyze the data. In step 1010, the analyzed data is used, for example, to determine consumer preferences and/or buying habits. The data may be analyzed, for example, for a plurality of vending machines 618, 618′, 618″ within any geographic boundary/boundaries, during any time period(s), and/or for any product(s).

In step 1012, as determined at least in part by analysis of the aggregated data, one or more audible and/or visual advertisements may optionally be transmitted to one or more designated vending machines. For example, if a consumer makes a vending machine purchase with a credit card, the customer profile may advantageously be accessed, whereafter an advertising messaged can be transmitted real-time to the vending machine based on the consumer profile. Alternatively, when a credit card is not used, advertising can be based on, for example, the location, time of day, and/or sales that have occurred during a previous predetermined time period (e.g., hour, day, week, month, etc). In yet another embodiment, advertising information can be downloaded at predetermined times (e.g., low usage rates) or at times corresponding to a predetermined level of network traffic (e.g., low network traffic). In still another embodiment, machine owners, as determined at least in by analysis of the aggregated data, an advertising message that is transmitted to a plurality of machines. In still another embodiment, advertising information can be downloaded, as determined at least in part by analysis of the aggregated data, to one or more vending machines within a predetermined time period (e.g., sometime in the next 72 hours) and be displayed or audibly played for a predetermined period of time (e.g., 24 hours). A dedicated distribution server may optionally be provided to transmit the desired advertising messages to the vending machines.

Figure 11B:
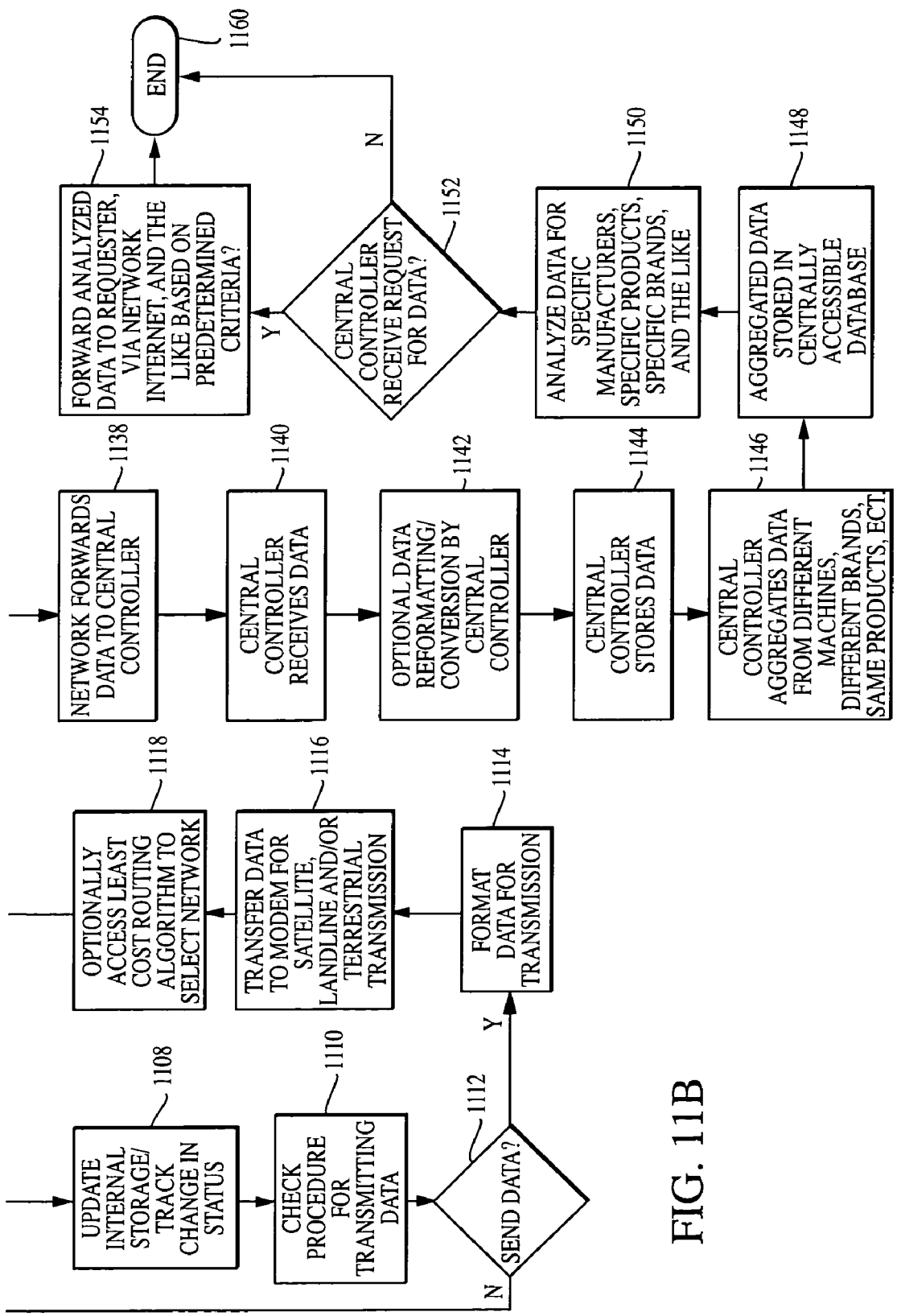
FIG. 11 is a more detailed flowchart of the computer implemented process for aggregating vending machine data in accordance with the present invention.

FIG. 11 shows a more detailed flow diagram in accordance with the present invention. The process starts at 1100, after which the status of the vending machine is checked in accordance with conventional methods. In decision step 1104 a determination is made whether a purchase has been made. If a purchase has been made, an inventory update is performed in step 1108. If a purchase has not been made, a determination is made in decision step 110 as to whether a user has attempted to make a purchase. If a user has not attempted to make a purchase, the process reverts to step 1102; if a user has attempted to make a purchase, the process proceeds to step 1108.

In step 1110, the procedure for transmitting data is determined. This can be, as previously discussed, by one of the terrestrial network 604, by the Internet 606 or similar network, by a satellite 614 transmission, and/or by a landline network. Upon determining that data should be sent in decision step 1112, the data is formatted for transmission in step 1114. In step 1116, the data is transferred to a modem for transmission, whereafter in step 1118 the intelligent routing logic may be optionally invoked to determine, for example the least cost transmission path and/or fastest transmission path.

In step 1120, the data is transmitted and subsequently received at, for example, a gateway 804, base station 710, ACE 714, or central computer 612, as previously discussed. In step 1124, any necessary protocol conversions are made by the gateway 804. In decision step 1126, a determination is made whether the protocol conversion was successful. If the protocol conversion was successful, the data transmitted is received in step 1128; if the protocol conversion was not successful, the data is retransmitted in step 1130, optionally using a second protocol.

In step 1132, a determination is made whether the data needs to be reformatted, as discussed in regard to FIGS. 9E and 9F. If the data requires reformatting, the gateway 804 reformats the data 1134. In step 1136, the gateway 804 transmits the data to the designated network (e.g., satellite, terrestrial, etc.), after which the network forwards the data to a central computer 1138 such as computer 612.

In step 1140 the central computer 612 receives the data, and in step 1142 the computer may optionally perform any necessary data reformatting and/or conversions. The data is then stored 1144 and subsequently aggregated 1146. The aggregated data is then stored 1148, preferably in a centrally accessible database. In step 1150, the aggregated data is then analyzed, preferably using a data mining or similar software package residing on, for example, a software server 810, 812, 816. In decision step 1152, if it is determined that a request has been made to download the aggregated data, the data is subsequently transmitted to the appropriate requester. The process then terminates at step 1160.

Under the above described methodology, various combinations of the above collected information from single or multiple vending machines may be used, optionally in accordance with predefined rules.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what I claim as new and desire to secure by Letters Patent is as follows:

1. A system for aggregating and analyzing data from a plurality of data generating machines comprising:

a plurality of data generating machines each transmitting data pertaining to at least one monitored sales event, said at least one monitored sales event capable of corresponding to a plurality of different products from a plurality of sales, distribution or manufacturing sources effectuated or managed by each of said plurality of data generating machines via at least one of a terrestrial, Internet, satellite, and landline network using at least one intelligent routing device that selects a least cost data transmission path over at least one of said at least one terrestrial, Internet, satellite, and landline network;

at least one gateway device positioned between at least one of said plurality of data generating machines and at least one of the terrestrial, Internet, satellite, and landline network, wherein said at least one gateway device enables the transceiver of at least one of said at least one data generating machine and the respective terrestrial, Internet, satellite and landline network to which it transmits to operatively communicate, and wherein said at least one gateway performs a data transmission protocol conversion between at least one first network and at least one second network among said at least one of the terrestrial, Internet, satellite and landline networks; and at least one computer responsively connectable to said plurality of data generating machines via said at least one of a terrestrial, Internet, satellite and landline network, wherein the at least one computer is configured to:

receive and cumulatively store the data transmitted by each of said plurality of data generating machines corresponding to a predetermined time period, and including at least one application software program running thereon that analyzes the aggregated data; and transmit to at least one of said plurality of data generating machines one or more audible and/or visual data that contain message content at least partially in response to the analyzed data including a consumer profile.

2. The system according to claim 1, wherein said plurality of data generating machines is capable of transmitting the data utilizing a plurality of data formats, and wherein said at least one computer stores the plurality of formats and at least one of reformats and interprets the transmitted data utilizing at least one of said plurality of data formats prior to cumulatively storing the transmitted data.

3. The system according to claim 1 wherein the cumulatively stored data on said at least one computer is analyzed to determine at least one of consumer buying habits and preferences.

4. The system according to claim 1 wherein a transceiver in at least one of said plurality of data generating machines transmits data using a same data transmission protocol as one of the respective terrestrial, Internet, satellite and landline networks to which it transmits.

5. The system according to claim 1 wherein each of said plurality of data generating machines comprises a processor with storage configured to accumulate data corresponding to the at least one monitored sales event occurring in each of said plurality of data generating machines, wherein a transceiver transmits the accumulated data to said at least one first computer via at least one of the respective terrestrial, Internet, satellite and landline network.

6. The system according to claim 5 wherein the processor is configured to accumulate, for each of said plurality of data generating machines, data corresponding to at least one of paper and/or non-paper monies deposited in and/or returned, alarm conditions, machine serial number, machine model, machine address, machine route number, machine owner, product sold, sales price, date and/or time of purchase, length of time product in machine, and number and/or types of products remaining in machine.

7. The system according to claim 5 wherein the processor is configured to accumulate, for each of said plurality of data generating machines, data corresponding to paper and/or non-paper monies deposited in and/or returned, alarm conditions, machine serial number, machine model, machine address, machine route number, machine owner, product sold, sales price, date and/or time of purchase, length of time product in machine, and number and/or types of products remaining in machine.

8. The system according to claim 1 wherein the application software program provides a recommended replenishment schedule and/or replenishment goods for at least one of said plurality of data generating machines.

9. The system according to claim 1, wherein a third patty accesses the stored aggregated data via said at least one computer.

10. A method of collecting and aggregating data from a plurality of data generating machines, the method comprising the steps of:
transmitting data pertaining to at least one monitored sales event associated with each of a plurality of data generating machines via at least one of a terrestrial, Internet, satellite, and landline network using at least one intelligent routing device, and selecting a least cost data transmission path over the at least one of said at least one terrestrial, Internet, satellite, and landline network;
performing a data transmission protocol conversion between at least one first network and at least one second network among said at least one of the terrestrial, Internet, satellite, and landline networks using at least one gateway device;
receiving the transmitted data at at least one computer;
storing cumulatively the data transmitted over a predetermined time period by each of the plurality of data generating machines;
analyzing the cumulatively stored data; and
transmitting to at least one of the plurality of data generating machines one or more audible and/or visual data that contain message content at least partially in response to the analyzed data including a consumer profile.

11. The method according to claim 10 wherein the plurality of data generating machines transmits the data utilizing one of a plurality of data formats, and the at least one computer stores the plurality of data formats and at least one of reformats and interprets the transmitted data prior to said storing step.

12. The method according to claim 10 wherein the data is analyzed to determine at least one of consumer buying habits and preferences.

13. The method according to claim 10 wherein at least one application software program is used to analyze the stored data.

14. The method according to claim 10 wherein at least one of the one or more audible and/or visual advertisements is sent is response to an analysis of at least one of the location, time of day, and sales that have occurred during one or more predetermined time periods.

15. The method according to claim 10 wherein at least one of the one or more audible and/or visual advertisements is transmitted at one or more predetermined times.

16. The method according to claim 10 wherein at least one of the one or more audible and/or visual advertisements are transmitted in accordance with a predetermined network transmission cost.

17. The method according to claim 10 wherein at least one of the one or more audible and/or visual advertisements is transmitted at one or more times corresponding to a predetermined level of network traffic.

18. The method according to claim 10 further comprising the step of selling at least a portion of the cumulatively stored data to a third party.

19. The method according to claim 18 wherein a network transmission discount is provided to the third party who purchases at least a portion of the stored data.

20. The method according to claim 19 wherein access to the aggregated data is provided via at least one application software program for analyzing the data to determine the at least one of consumer buying habits and preferences.

21. The method according to claim 10 further comprising the step of offering at least a portion of the cumulatively stored data for sale.

22. A computer readable medium storing instructions executable by a computer, the instructions instructing the computer to aggregate and analyze data from a plurality of data generating machines, said instructions comprising:
receiving on at least one computer transmitted data pertaining to at least one monitored sales event over a predetermined time period of each of a plurality of data generating machines via at least one of a terrestrial, Internet, satellite, and landline network;
directing at least one of the plurality of data generating machines to select a least cost data transmission path over at least one of the at least one terrestrial, Internet, satellite and landline network;
storing cumulatively the data transmitted by each of the plurality of data generating machines in a first file format;

analyzing the cumulatively stored data; and transmitting to at least one of the plurality of data generating machines one or more audible and/or visual data that contain message content at least partially in response to the analyzed data including a consumer profile.

23. The computer readable medium according to claim 22 further comprising instructions that direct the at least one computer to at least one of reformat and interpret the transmitted data having a plurality of predefined data formats prior to cumulatively storing the transmitted data.

24. The computer readable medium according to claim 22 further comprising instructions that analyze the cumulatively stored data on the at least one computer to determine at least one of consumer buying habits and preferences.

25. The computer readable medium according to claim 22 further comprising instructions that enable an application software program to operatively communicate with the at least one computer.

26. The computer readable medium according to claim 22 further comprising instructions that enable conversion of the first file format to a second file format that is compatible with an application software program used to analyze the data.

27. The computer readable medium according to claim 22 wherein at least one of the one or more audible and/or visual advertisements is sent is response to an analysis of at least one of the location, time of day, and sales that have occurred during one or more previous predetermined time periods.

28. The computer readable medium according to claim 22 wherein at least one of the one or more audible and/or visual advertisements is transmitted at one or more predetermined times.

29. The computer readable medium according to claim 22 wherein at least one of the one or more audio and/or visual advertisements are transmitted in accordance with a predetermined network transmission cost.

30. The computer readable medium according to claim 22 wherein at least one of the one or more audio and/or visual advertisements is transmitted at one or more times corresponding to a predetermined level of network traffic.

31. The computer readable medium according to claim 22 further comprising instructions that enable at least one second computer to operatively communicate with the at least one computer to analyze the aggregated data to determine at least one of consumer buying habits and preferences.

32. A system for aggregating and analyzing data from a plurality of data generating machines comprising:

means for transmitting data pertaining to at least one monitored sales event, said at least one monitored sales event capable of corresponding to a plurality of different products from a plurality of sales, distribution or manufacturing sources effectuated or managed by each of said means for transmitting via at least one of a terrestrial, Internet, satellite, and landline network, wherein said means for transmitting selects a least cost data transmission path over the at least one of said at least one terrestrial, Internet, satellite, and landline network;

means for performing a data transmission protocol conversion between at least one first network and at least one second network among said at least one of the terrestrial, Internet, satellite, and landline networks;

means for receiving and cumulatively storing the data transmitted by said means for transmitting, said means for receiving is responsively connectable to said means for transmitting via said at least one of a terrestrial, Internet, satellite and landline network;

means for analyzing the cumulatively stored data;

means for transmitting one or more audible and/or visual advertisements that contain message content at least partially in response to the analyzed data including a consumer profile and in accordance with a predetermined network transmission cost and predetermined level of network traffic.

33. The system according to claim 32, wherein said means for transmitting data is capable of transmitting the data utilizing a plurality of data formats, and wherein said means for receiving and cumulatively storing the data stores the data and at least one of reformats and interprets the transmitted data utilizing at least one of the plurality of data formats prior to cumulatively storing the transmitted data.

34. The system according to claim 32 wherein the cumulatively stored data on said means for receiving and cumulatively storing is analyzed to determine at least one of consumer buying habits and preferences.

35. The system according to claim 32 wherein said means for transmitting data transmits data using a same data transmission protocol as one of the respective terrestrial, Internet, satellite and landline networks to which it transmits.

36. The system according to claim 32 wherein said means for transmitting data comprises a processor with storage configured to accumulate data corresponding to the at least one monitored sales event, and wherein said means for transmitting transmits the accumulated data to said means for receiving and cumulatively storing via at least one of the respective terrestrial, Internet, satellite and landline network.

37. The system according to claim 36 further comprising means for enabling said means for receiving and cumulatively storing data and said means for transmitting to operatively communicate, wherein said means for enabling is positioned between said means for transmitting and at least one of the respective terrestrial, Internet, satellite and landline network to which it transmits to operatively communicate.

38. The system according to claim 36 wherein the processor is configured to accumulate, for said means for receiving and cumulatively storing, data corresponding to at least one of paper and/or non-paper monies deposited in and/or returned, alarm conditions, machine serial number, machine model, machine address, machine route number, machine owner, product sold, sales price, date and/or time of purchase, length of time product in machine, and number and/or types of products remaining in machine.

39. The system according to claim 36 wherein the processor is configured to accumulate, for said means for receiving and cumulatively storing, data corresponding to paper and/or non-paper monies deposited in and/or returned, alarm conditions, machine serial number, machine model, machine address, machine route number, machine owner, product sold, sales price, date and/or time of purchase, length of lime product in machine, and number and/or types of products remaining in machine.

* * * * *

UNITED STATES PATENT AND TRADEMARK OFFICE
CERTIFICATE OF CORRECTION

| | | |
|---|---|---|
| PATENT NO. | : 7,089,322 B1 | Page 1 of 1 |
| APPLICATION NO. | : 09/697316 | |
| DATED | : August 8, 2006 | |
| INVENTOR(S) | : Mark Stallmann | |

It is certified that error appears in the above-identified patent and that said Letters Patent is hereby corrected as shown below:

FIG. 11A – inside box 1130 "PROTOCAL" should read -- PROTOCOL --

Column 1, line 19, "collected the data" should read -- collected data --

Column 2, line 66, "dynamic access random memory" should read -- dynamic random access memory --

Column 3, line 48, "that gets transmits" should read -- that transmits --

Column 11, line 12, "enable to subscriber" should read -- enable subscriber --

Column 12, line 6, "704 706" should read -- 704, 706 --

Column 13, line 18, "618 is and 'understood'" should read -- 618 is 'understood' --

Column 21, line 53 (Claim 32), "man aged" should read -- managed --

Signed and Sealed this

Twelfth Day of October, 2010

David J. Kappos
*Director of the United States Patent and Trademark Office*